US009456422B2

(12) United States Patent
Chande et al.

(10) Patent No.: US 9,456,422 B2
(45) Date of Patent: Sep. 27, 2016

(54) METHOD AND APPARATUS FOR CALIBRATING TRANSMIT POWER OF A FEMTO NODE

(75) Inventors: Vinay Chande, San Diego, CA (US); Sumeeth Nagaraja, San Diego, CA (US); Farhad Meshkati, San Diego, CA (US); Satashu Goel, San Diego, CA (US); Yan Zhou, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1153 days.

(21) Appl. No.: 13/450,949

(22) Filed: Apr. 19, 2012

(65) Prior Publication Data

US 2013/0102309 A1 Apr. 25, 2013

Related U.S. Application Data

(60) Provisional application No. 61/477,945, filed on Apr. 21, 2011.

(51) Int. Cl.
*H04W 4/00* (2009.01)
*H04B 7/00* (2006.01)
*H04W 52/24* (2009.01)
(Continued)

(52) U.S. Cl.
CPC ............ *H04W 52/243* (2013.01); *H04B 17/11* (2015.01); *H04W 52/244* (2013.01); *H04W 52/247* (2013.01); *H04W 52/325* (2013.01); *H04W 52/143* (2013.01); *H04W 52/226* (2013.01); *H04W 52/242* (2013.01); *H04W 52/245* (2013.01); *H04W 52/287* (2013.01); *H04W 52/40* (2013.01)

(58) Field of Classification Search
CPC .... H04W 52/40; H04W 52/38; H04W 52/04
USPC ................................................. 455/435.1, 522
See application file for complete search history.

(56) References Cited

U.S. PATENT DOCUMENTS

| 6,052,598 A | 4/2000 | Rudrapatna et al. |
| 8,068,440 B2 | 11/2011 | Stanwood et al. |

(Continued)

FOREIGN PATENT DOCUMENTS

| CN | 101142832 A | 3/2008 |
| EP | 1633059 A2 | 3/2006 |

(Continued)

OTHER PUBLICATIONS

International Search Report and Written Opinion—PCT/US2012/034580—ISA/EPO—Nov. 2, 2012.

(Continued)

*Primary Examiner* — Omoniyi Obayanju
(74) *Attorney, Agent, or Firm* — Jia J. Wu

(57) ABSTRACT

Methods and apparatuses are provided that include calibrating transmit power of a femto node based on measuring one or more parameters related to usage of the femto node. The femto node can temporarily increase transmit power and analyze received measurement reports to determine a transmit power calibration. The femto node can additionally measure uplink received signal strength indicators over multiple time periods following handover of a user equipment (UE) to determine whether to increase transmit power to cover the UE.

42 Claims, 15 Drawing Sheets

(51) Int. Cl.
*H04W 52/32* (2009.01)
*H04B 17/11* (2015.01)
*H04W 52/14* (2009.01)
*H04W 52/22* (2009.01)
*H04W 52/28* (2009.01)
*H04W 52/40* (2009.01)

(56) References Cited

U.S. PATENT DOCUMENTS

| | | |
|---|---|---|
| 8,792,886 B2 | 7/2014 | Meshkati et al. |
| 2003/0031135 A1* | 2/2003 | Itoh .................. H04W 52/12 370/252 |
| 2007/0042799 A1 | 2/2007 | Jubin et al. |
| 2008/0102877 A1* | 5/2008 | Suemitsu ............ H04W 52/362 455/522 |
| 2008/0188265 A1* | 8/2008 | Carter ................ H04W 52/346 455/561 |
| 2009/0042593 A1 | 2/2009 | Yavuz et al. |
| 2009/0111499 A1 | 4/2009 | Bosch et al. |
| 2009/0279519 A1 | 11/2009 | Brisebois et al. |
| 2011/0195730 A1* | 8/2011 | Chami ................ H04W 52/244 455/501 |

FOREIGN PATENT DOCUMENTS

| | | |
|---|---|---|
| GB | 2445990 | 7/2008 |
| JP | 2006074322 A | 3/2006 |
| WO | 2010078476 A1 | 7/2010 |
| WO | WO-2010124243 A1 | 10/2010 |
| WO | WO2011107453 A1 | 9/2011 |

OTHER PUBLICATIONS

Patel C, et al., "Femtocell and Beacon Transmit Power Self-Calibration", Internet Citation, [Online] pp. 1-8, XP002637750, Retrieved from the Internet: URL:http://www.qualcomm.com/documents/files/femtocell-and-beacon-transmitpower-self-calibration.pdf> [retrieved on May 16, 2011].

Yavuz M., et al.,"Interference management and performance analysis of UMTS/HSPA+ femtocells", IEEE Communications Magazine, IEEE Service Center, Piscataway, US, vol. 47, No. 9, Sep. 1, 2009, pp. 102-109, XP011283371, ISSN: 0163-6804, DOI: 10.1109/MCOM.2009.5277462.

Tokgoz, et al., "1xEV-DO Femtocell Performance and Capacity Analysis," Qualcomm, Feb. 2010, pp. 1.1-1 to 1.1-7.

European Search Report—EP14171136—Search Authority—Munich—Sep. 17, 2014.

* cited by examiner

METHOD AND APPARATUS FOR CALIBRATING TRANSMIT POWER OF A FEMTO NODE

CLAIM OF PRIORITY UNDER 35 U.S.C. §119

The present application for patent claims priority to Provisional Application No. 61/477,945, entitled "METHOD AND APPARATUS FOR ESTIMATING HOME USER USAGE AT FEMTOCELLS" filed Apr. 21, 2011, assigned to the assignee hereof and hereby expressly incorporated by reference herein.

BACKGROUND

1. Field

The following description relates generally to wireless network communications, and more particularly to determining usage at a femto node.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. Such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

Such low power base stations can calibrate power based on sensing surrounding radio frequency conditions and/or obtaining channel conditions from served UEs via measurement reports. Such power calibration, however, may not be sufficient to operate a low power base station in a desired manner, such as for providing a desired coverage area within boundaries of an area (e.g., within walls or floors of a home or office, etc.), since only potential interference to other nodes or devices is considered.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with calibrating power of a femto node based in part on inferring or measuring usage parameters for devices served by the femto node. In one example, the femto node can increase a coverage area during a call, and determine usage parameters during this time based on channel condition reports received by the device. In another example, the femto node can similarly increase coverage area and collect measurement reports from various devices (e.g., served or non-member devices), and can calibrate a transmission power to provide support for served device while minimizing interference to non-member devices. In yet another example, the femto node can evaluate a received signal strength following handover of a device to determine whether the device is leaving vicinity of the femto node, or staying within the vicinity but just out of range of the femto node. The femto node can calibrate transmission power based on this evaluation.

According to an example, a method for calibrating transmission power of a femto node is provided. The method includes increasing a transmit power of a femto node from a base transmit power for a duration of time and receiving one or more measurement reports from one or more user equipments (UEs) during the duration of time. The method further includes calibrating the base transmit power of the femto node based in part on the one or more measurement reports and the increased transmit power.

In another aspect, an apparatus for apparatus for calibrating transmission power of a femto node is provided. The apparatus includes at least one processor configured to increase a transmit power of a femto node from a base transmit power for a duration of time and receive one or more measurement reports from one or more UEs during the duration of time. The at least one processor is further configured to calibrate the base transmit power of the femto node based in part on the one or more measurement reports and the increased transmit power. The apparatus further includes a memory coupled to the at least one processor.

In yet another aspect, an apparatus for calibrating transmission power of a femto node is provided. The apparatus includes means for increasing a transmit power of a femto node from a base transmit power for a duration of time and means for receiving one or more measurement reports from one or more UEs during the duration of time. The apparatus further includes means for calibrating the base transmit power of the femto node based in part on the one or more measurement reports and the increased transmit power.

Still, in another aspect, a computer-program product for calibrating transmit power of a femto node is provided including a non-transitory computer-readable medium having code for causing at least one computer to increase a transmit power of a femto node from a base transmit power for a duration of time. The computer-readable medium further includes code for causing the at least one computer to receive one or more measurement reports from one or more UEs during the duration of time and code for causing the at least one computer to calibrate the base transmit power of the femto node based in part on the one or more measurement reports and the increased transmit power.

Moreover, in an aspect, an apparatus for calibrating transmission power of a femto node is provided that includes a power adjusting component for increasing a transmit power of a femto node from a base transmit power for a duration of time and a measurement report receiving component for receiving one or more measurement reports from one or more UEs during the duration of time. The apparatus further includes a power calibrating component for calibrating the base transmit power of the femto node based in part on the one or more measurement reports and the increased transmit power.

According to an example, a method for calibrating transmission power of a femto node is provided. The method includes detecting a handover of a served UE from a femto node to another node and measuring an uplink received signal strength indicator (RSSI) at the femto node over a plurality of time periods based on the detecting the handover. The method further includes calibrating a transmit power of the femto node based on comparing the uplink RSSI measured over the plurality of time periods.

In another aspect, an apparatus for apparatus for calibrating transmission power of a femto node is provided. The apparatus includes at least one processor configured to detect a handover of a served UE from a femto node to another node and measure an uplink RSSI at the femto node over a plurality of time periods based on the detecting the handover. The at least one processor is further configured to calibrate a transmit power of the femto node based on comparing the uplink RSSI measured over the plurality of time periods. The apparatus further includes a memory coupled to the at least one processor.

In yet another aspect, an apparatus for calibrating transmission power of a femto node is provided. The apparatus includes means for detecting a handover of a served UE from a femto node to another node and means for measuring an uplink RSSI at the femto node over a plurality of time periods based on the detecting the handover. The apparatus further includes means for calibrating a transmit power of the femto node based on comparing the uplink RSSI measured over the plurality of time periods.

Still, in another aspect, a computer-program product for calibrating transmit power of a femto node is provided including a non-transitory computer-readable medium having code for causing at least one computer to detect a handover of a served UE from a femto node to another node. The computer-readable medium further includes code for causing the at least one computer to measure an uplink RSSI at the femto node over a plurality of time periods based on the detecting the handover and code for causing the at least one computer to calibrate a transmit power of the femto node based on comparing the uplink RSSI measured over the plurality of time periods.

Moreover, in an aspect, an apparatus for calibrating transmission power of a femto node is provided that includes a UE mode determining component for detecting a handover of a served UE from a femto node to another node. The apparatus further includes a RSSI measuring component for measuring an uplink RSSI at the femto node over a plurality of time periods based on the detecting the handover and a power calibrating component for calibrating a transmit power of the femto node based on comparing the uplink RSSI measured over the plurality of time periods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
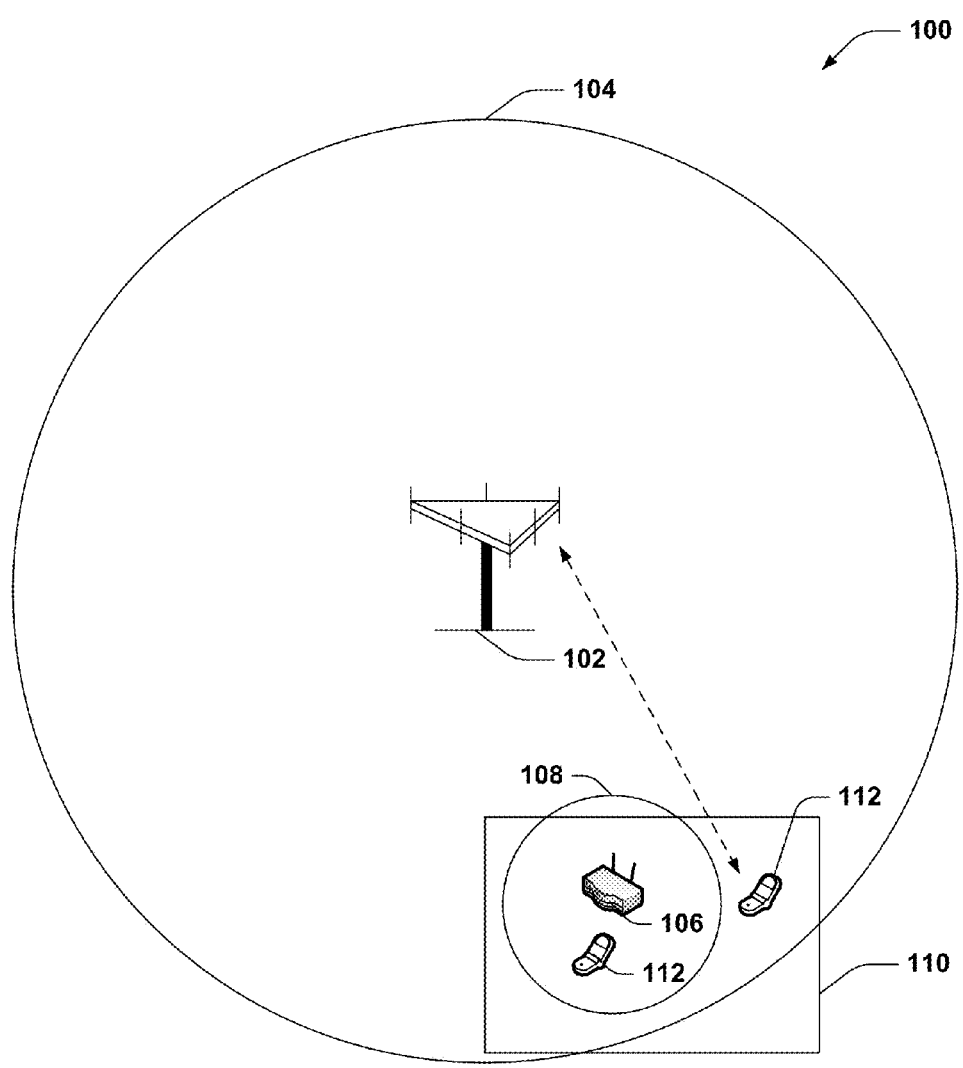
FIG. 1 is a block diagram of an example wireless communication system that serves a user equipment (UE) using a femto node operating within a premises.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a low power base station, or femto node, can calibrate transmission power based at least in part on one or more aspects regarding user equipment (UE) served by the femto node. For instance, a femto node can determine or otherwise infer a usage pattern of one or more UEs at the femto node to detect areas of a premises related to the femto node for which coverage is not available. The femto node can calibrate its transmit power in an effort to cover such areas. The areas can be inferred based in part on observing representative parameters. In one example, a femto node can apply short term power adjustments for at least pilot channel transmissions to facilitate determining such parameters. For instance, the femto node can extend a coverage area for one or more UEs by increasing power of a pilot channel transmission when the UEs operate in an active mode (e.g., during a call). In this example, the femto node can determine power calibration for serving the UE based at least in part on receiving measurement reports from the UE during the period of active mode. For example, where the UE moves outside of a previous coverage area while in active mode, the femto node can determine to calibrate the transmit power based on measurement reports received while the transmit power is increased.

In another example, the femto node can increase transmit power of at least the pilot transmissions to additionally capture registrations from surrounding UEs. In this example, the femto node can obtain measurement reports from served and/or non-member UEs, regardless of communications mode (e.g., idle or active) to determine a transmit power for adequately serving the served UEs without substantially interfering the non-member UEs. In yet another example, the femto node can measure an uplink received signal strength indicator (RSSI) as a previously served UE moves away from femto node coverage. The RSSI values can be measured at various times to determine whether the UE is continually moving away into macro node coverage or whether the UE is in an area of coverage not served by the femto node, but that may be part of an area of a premises for which femto node coverage is desired. Such mechanisms are used to estimate UE usage respective to a femto node, and can thus be used for improving femto node calibration to improve UE communications with the femto node.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that facilitates calibrating power of a femto node based on UE usage. System 100 comprises a base station 102 that implements coverage area 104 for providing wireless network access to one or more UEs. UEs within coverage area 104 can communicate with the base station 102 using one or more wireless technologies to receive access to a core wireless network (not shown). Base station 102 can be a macro node, femto node, pico node, mobile base station, relay, UE (e.g., communicating in peer-to-peer or ad-hoc mode with one or more UEs), a portion thereof, and/or substantially any device that can provide wireless network access to one or more UEs. In addition, system 100 includes a femto node 106 providing coverage area 108 within a premises 110. For example, the femto node 106 can be substantially any low power base station, such as a H(e)NB, etc., that provides wireless network access to one or more UEs, such as UE 112, based on restricted association of the UEs to the femto node 106. For example, the restricted association can include a closed subscriber group (CSG) provided by the femto node 106, of which UE 112 is a member. Moreover, the premises 110 can include a structure, such as a home of a user, an office, and/or the like, or substantially any bounded physical area. Additionally, UE 112 can be a mobile terminal, a stationary device, a modem (or other tethered device), a portion thereof, and/or substantially any device that can receive wireless network access from a base station.

For example, as shown, the coverage area of the femto node 106 may not cover all areas of the premises 110. As described, current power calibration mechanisms consider sensed radio frequency (RF) conditions to calibrate power, and such a deficiency with respect to coverage the premises 110 may result from using such mechanisms. In this case, UE 112 can move from within coverage area 108 of femto node 106 inside the premises 110, to outside of the coverage area 108 while within the premises 110, in which case UE 112 connects to another base station, such as base station 102, for receiving wireless network access. This behavior may not be desired of the femto node 106. Thus, as described herein, femto node 106 can estimate or otherwise infer UE 112 or other UE usage of femto node 106 in certain scenarios based on observing one or more parameters to determine whether to expand coverage area 108 to improve communications for UE 112 and/or other UEs.

In one example, where UE 112 is within coverage area 108 and establishes a call with another UE (e.g., voice call, data call, etc.) or is otherwise operating in an active communications mode, femto node 106 can temporarily increase transmit power of at least a pilot channel to serve UE 112 in an extended coverage area. For example, femto node 106 can increase the transmit power using a fixed increment, dynamic power adjustment, adjustment based on a history of transmit power, and/or the like. UE 112 can communicate measurement reports of channel conditions to femto node 106 during the call in the extended coverage area. Femto node 106 can accordingly calibrate transmit power, at least for an idle communications mode, based on the measurement reports to ensure coverage for UE 112 in other areas of the premises 110 within which UE 112 was present and provided a measurement report. For example, femto node 106 increases transmit power to ensure coverage for UE 112, and can compute the power calibration using the measurement reports, which can include determining a lowest measurement and a power necessary to ensure the lowest measurement is over a threshold to prevent handover of UE 112. In another example, femto node 106 can calibrate transmit power based on computing an average measurement of femto node 106 and selecting a transmit power to ensure the average measurement remains at least at a threshold, and/or the like.

In another example, femto node 106 can temporarily increase transmit power while UE 112 is in idle mode, and can receive registration attempts from UE 112, if UE 112 is operating outside of coverage area 108, as well as other UEs that are within range of the extended coverage area caused by the temporary increase in transmit power. In addition, the registration attempts can include measurement reports including measurements of femto node 106 and/or another base station, such as base station 102, at the UEs. In this regard, femto node 106 can calibrate transmission power based on the measurement reports and whether the UEs from which the measurement reports are received are members at femto node 106 (e.g., members of a CSG provided by femto node 106). For example, femto node 106 can increase transmit power based on a registration attempt and measurement report received from UE 112 where UE 112 is outside of coverage area 108 but inside of the extended coverage area. In addition, where femto node 106 receives a registration attempt and measurement report from another UE that is a non-member UE at femto node 106, femto node 106 can calibrate transmit power for UE 112 while not causing substantial interference with the non-member UE (based on the measurement report therefrom).

In yet another example, femto node 106 can measure uplink (UL) RSSI, or a similar metric, when UE 112 is in a call to determine whether a handout by UE 112 (e.g., to base station 102) is caused by UE 112 leaving premises 110 or moving to a different area within the premises 110 that is outside of coverage area 108. Femto node 106, in this example, can compare UL RSSI reports after handover of UE 112 to base station 102 to determine whether the RSSI decreases, and/or an amount of decrease, over a period of time. For instance, a UE moving outside of premises 110 can correlate to a steadily decreasing UL RSSI, as opposed to a UE remaining on premises 110 but outside of coverage area 108. In this regard, where femto node 106 determines UL RSSI is not steadily decreasing, femto node 106 can calibrate transmit power to expand coverage area 108 in an attempt to provide service to UE 112. In any case, the transmit power of femto node 106 is adjusted to attempt more optimal coverage for UEs within premises 110. In one example, femto node 106 can calibrate its transmit power to serve UE 112 at fixed increments until UE 112 is served, at one or more increments determined based on the RSSI measurements, and/or the like.

Figure 2:
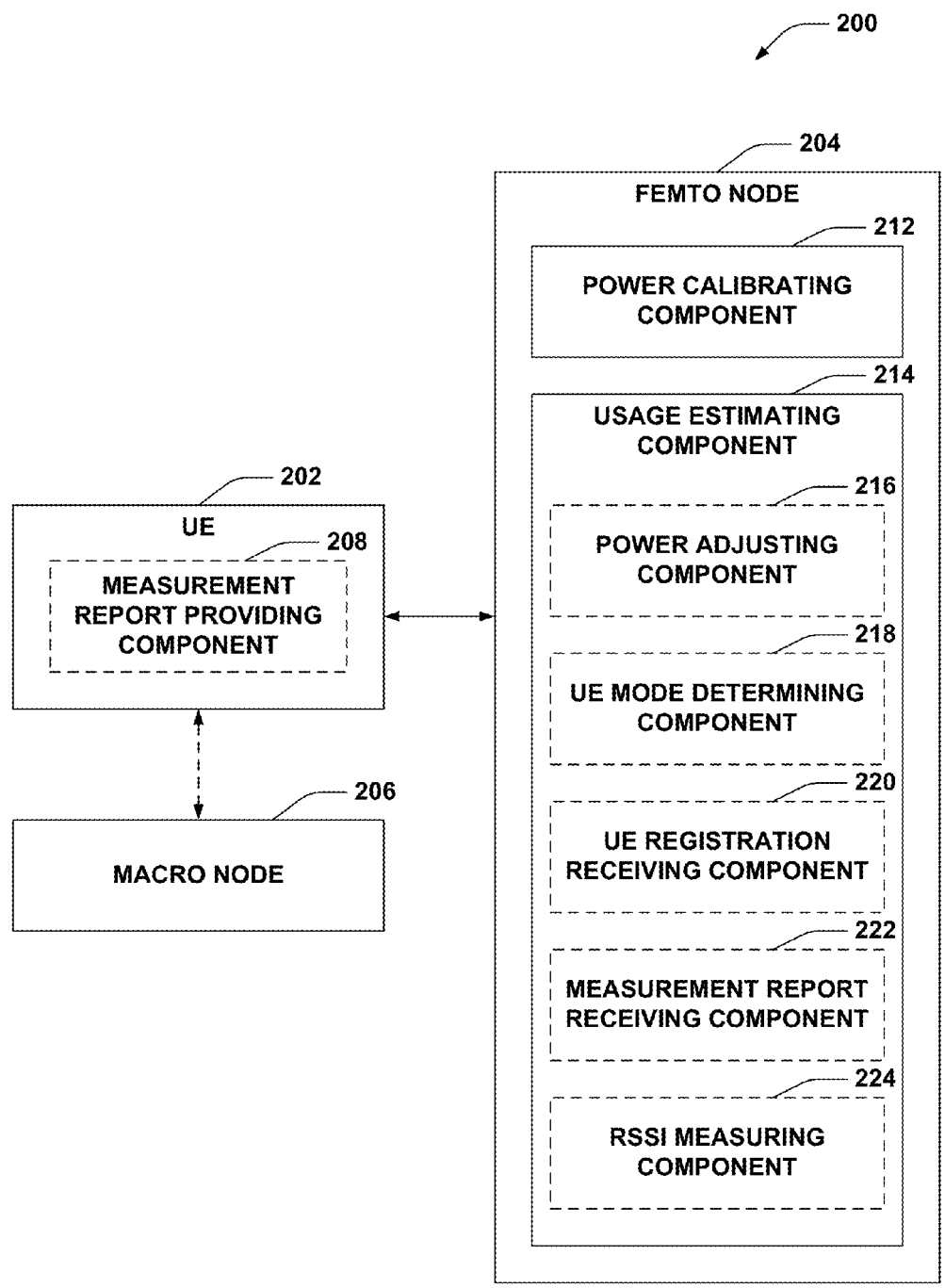
FIG. 2 is a block diagram of an example wireless communication system for expanding coverage of a femto node over a premises based on monitoring one or more usage parameters.

Turning to FIG. 2, an example wireless communication system 200 is illustrated that facilitates adjusting power of a femto node. System 200 comprises a UE 202 that communicates with a femto node 204 to receive access to a wireless network. In addition, system 200 can include a macro node 206 that can provide access to the wireless network in a larger coverage area. As described, femto node 204 can be a smaller coverage access point, such as a H(e)NB, etc., in a home of a user, an office, and/or the like. UE 202, as described, can be a mobile terminal, stationary terminal, modem (or other tethered UE), a portion thereof, and/or the like.

UE 202 optionally comprises a measurement report providing component 208 for communicating a measurement report to one or more base stations.

Femto node 204 can include a power calibrating component 212 for determining a transmit power calibration for the femto node 204 based at least in part on one or more determined parameters regarding a UE, and a usage estimating component 214 for observing parameters for determining UE usage of femto node 204. Usage estimating component 214 can optionally include one or more components to facilitate observing such parameters, such as a power adjusting component 216 for adjusting a transmit power of femto node 204, a UE mode determining component 218 for determining an operating mode of a UE connected to femto node 204, a UE registration receiving component 220 for obtaining registration requests from one or more UEs, a measurement report receiving component 222 for obtaining measurement reports from one or more UEs, and/or a RSSI measuring component 224 for obtaining UL RSSI values at femto node 204.

According to an example, UE 202 can communicate with femto node 204 to receive wireless network access. Femto node 204, however, may not adequately cover certain areas within a premises in which the femto node 204 resides. Thus UE 202 can handover to macro node 206 when moving outside of coverage of femto node 204 but still within the premises. Usage estimating component 214 can attempt to detect such usage of the femto node 204 based on observing one or more parameters, as described above and further herein, and power calibrating component 212 can determine a power calibration for femto node 204 transmissions to accordingly expand coverage of femto node 204 within the premises.

In one example, UE mode determining component 218 can detect UE 202 transitioning from an idle to active communications mode with femto node 204 (e.g., where UE 202 receives or initiates a call over femto node 204). For instance, this can include receiving a random access preamble or other indication of a communications mode switch from the UE 202, receiving a page for the UE 202 from a core network component, and/or the like. A UE in an idle communications mode, also referred to herein as idle mode, can retain resources for receiving paging signals from a base station while terminating other resources with the base station to conserve power with the UE is not using a data link. A UE in an active communications mode, also referred to herein as idle mode, is served over multiple resources to facilitate data link communications.

In this example, power adjusting component 216 can determine to increase transmit power of a pilot channel at least during the period of time during which UE 202 is in active mode, which can result in improved communications of UE 202 at femto node 204 and receiving measurement reports from UE 202 for calibrating a transmit power. In one example, power adjusting component 216 can determine to increase the transmit power of femto node 204 by a fixed value (e.g., 10 decibel (dB)), a dynamic value, a value computed based on historical transmit power, and/or the like, while the UE 202 is in the active communications mode.

For example, power adjusting component 216 can increase transmit power for a common pilot indicator channel (CPICH) transmission of femto node 204 from a base transmit power to provide an extended coverage area at least while UE 202 is in active communications mode. This CPICH transmit power can be referred to as P_CPICH (active,t) for a given time period, t, in example computations described herein. During this time, measurement report receiving component 222 can obtain measurement reports from UE 202. In this example, measurement report providing component 208 generates and provides measurement reports to femto node 204 that at least include a signal strength or quality measurement of femto node 204. This can be based on solicitation from femto node 204 or otherwise according to a timer or other event based on communicating in active mode with femto node 204. It is to be appreciated, for example, that power adjusting component 216 can decrease the transmit power when UE mode determining component 218 detects a transition of UE 202 back to idle communications mode. This transmit power can be referred to as P(idle). This can include decreasing to the base transmit power and/or to a transmit power computed by power calibrating component 212, as described herein. In addition, it is to be appreciated that femto node 204 can modify transmit power of other channels in addition or alternatively to the CPICH transmit power, including power of broadcast channels, etc. In addition, for example modification of such channels can be proportional to the modified CPICH transmit power.

In one example, measurement report providing component 208 can communicate periodic measurement reports to femto node 204 while in active mode, where the femto node 204 is using the increased transmit power. For example, a measurement report can include a list of base stations from which UE 202 can receive signals, along with measurements of the signal strength or quality performed by UE 202 (e.g., ratio of energy per chip to power spectral density (Ec/Io), received signal code power (RSCP), pathloss, etc., of femto node 204, macro node 206, etc.). In one example, the measurement reports can be substantially similar to those utilized for evaluating handover for UE 202.

Measurement report receiving component 222 can obtain the measurement reports, and usage estimating component 214 can determine a usage pattern of the UE 202, which includes observing one or more parameters of UE 202 based on the measurement reports. This can include observing a minimum signal strength or quality of a signal from femto node 204 as experienced at a location by UE 202 during the active mode (e.g., as received in one or more measurement reports). In this regard, power calibrating component 212 can calibrate the base transmit power of femto node 204 such that the determined minimum signal strength or quality of femto node 204 experienced by the UE 202 at the location does not fall below a threshold resulting in handover of UE 202 when femto node 204 is operating at the base transmit power. The calibrated base transmit power can correspond to the P(idle), as described above, and thus a coverage area of femto node 204 is expanded during idle communications mode of UE 202 as well to serve the UE 202 in additional areas of the premises.

In one specific example, where the measurement reports include a CPICH RSCP measurement of X dB for macro node 206 and RSCP measurement of Y dB of femto node 204, where power adjusting component 216 increases transmit power of femto node 204 for determining the power calibration. Then, to calibrate transmit power to avoid handover of UE 202 to the macro node 206 at the UE 202 location, power calibrating component 212 can set the base transmit power of femto node 204 as P_current−Y+X+ReportingRange+Hyst, where P_current is the increased transmit power, and ReportingRange and Hyst are handover parameters at the femto node 204.

For example, where the channel conditions reported in the measurement report are favorable (e.g., signal strength or quality of the femto node 204 is a threshold difference greater than that of macro node 206), usage estimating component 214 can determine that a transmit power calibration can allow UE 202 to experience such channel conditions when communicating in idle mode. Power calibrating component 212 can calibrate the base transmit power of the femto node 204 according to the transmit power calibration, effectively extending the coverage area of femto node 204. It is to be appreciated that power calibrating component 212 can additionally consider a level of possible interference caused to macro node 206 and/or related UEs communicating therewith when determining whether to calibrate the transmit power (e.g., power calibrating component 212 can modify a computed calibration based on the determined level of interference, cancel the power calibration based on determined interference, and/or the like).

In one example, in increasing the transmit power for detecting usage by the UE 202 described above, power adjusting component 216 can determine a power adjustment for the UE 202 in an active communications mode as a fixed adjustment based on constant c1, which can be hardcoded, configured, or otherwise received from a wireless network, as described (e.g., 10 dB):

$$P\_CPICH(active,t)=P(idle)+c1$$

In another example, power adjusting component 216 can determine a power adjustment based at least in part on the measurement reports received from UE 202. For example, power adjusting component 216 can calculate a transmit power adjustment based at least in part on adding a reported signal strength of a strongest macro node (e.g., macro node 206), as received in the measurement reports, to a determined pathloss edge measurement at which femto node 204 initiates handout of UE 202 to the macro node:

$$P\_CPICH(active,t)=RSCP\_strongest\_macro(t-t1)+PL\_handout\_edge+c2$$

where RSCP_strongest_macro is the pilot signal strength at a macro node 206 received in one or more measurement reports from UE 202, PL_handout_edge is the pathloss edge at which handout to macro node 206 occurs, and c2 is a constant. For example, power adjusting component 216 determines the pathloss edge measurement based on a current or idle mode transmit power of the femto node 204, based on one or more parameters received from the UE 202, based on a value received over a wireless network, and/or the like. In another example, power adjusting component 216 can use the following formula to determine a transmit power adjustment for a UE in active mode:

$$P\_CPICH(active,t)=P\_CPICH(active,t)+\max(RSCP\_strongest\_macro(t-t1)+c3-RSCP\_femto,0)$$

where RSCP_femto is a pilot signal strength of femto node 204 received in one or more measurement reports from UE 202, and c3 is a constant.

In yet another example, power adjusting component 216 can determine a transmit power adjustment based on historical measurement reports from UE 202 in a previous switch to active mode. For example, power adjusting component 216 can compute the transmit power adjustment based on a percentile of measurements (e.g., signal strength or quality) of strongest macro nodes received over a period of time (e.g., for the given day). Power adjusting component 216 can add this computed value to the pathloss edge measurement and/or a constant described above:

$$P\_CPICH(active,t)=\text{percentile } RSCP\_strongest\_macro+PL\_handout\_edge+c2$$

where the percentile is an xth percentile (e.g., x=95 or some other value) over a period of time (e.g., in a given day). In any case, power adjusting component 216 can set the transmit power for CPICH based on one or more of the above. Regardless of the mechanism used, during the period of CPICH power increase described above, usage estimating component 214 can determine usage of the UE 202 at femto node 204 based on one or more parameters, such as received measurement reports, for calibrating overall transmit power of the femto node 204.

In another example, usage estimating component 214 can estimate UE usage of femto node 204 based at least in part on observing idle mode registrations received from UE 202, and/or other UEs, at femto node 204. In this example, power adjusting component 216 can effectuate a periodic transmit power burst (e.g., for CPICH transmissions) for a short duration of time at femto node 204 to extend the coverage area. The transmit power burst can relate to increasing transmit power of the femto node 204 pilot channel from a base transmit power for the short duration of time, and the transmit power burst can be at a large power to facilitate receiving measurement reports from various neighboring UEs. For example, the duration of time can be similar to a minimum time between evaluating neighboring base stations for handover at a UE (e.g., on the order of minutes) so as not to cause substantial interference to macro node 206 or other nodes or UEs for an extended period of time. Moreover, in an example, power adjusting component 216 can periodically adjust the transmit power during times when member UEs are expected to be within coverage of femto node 204 and/or during times of low network activity (e.g., early morning hours) so as not to cause substantial interference to macro node 206 during a period of heavy use. Also, for example, power adjusting component 216 can continue with periodically adjusting the transmit power for the pilot channel over a period of time (e.g., days) until sufficient measurement reports are gathered to calibrate the base transmit power, until one or more member UEs are served by the femto node 204, and/or the like.

In one example, power adjusting component 216 can increase a transmit power for CPICH by a value, increase the transmit power as necessary to capture UEs having a certain pathloss (e.g., 90 db), and/or the like. During the duration of time for the extended coverage area, UE registration receiving component 220 may obtain one or more additional UE registration attempts from UEs reselecting in idle mode from a different base station (e.g., macro node 206). In one example, the registration attempts can include measurement reports or at least a signal strength or quality measurement (e.g., Ec/Io, RSCP, pathloss, etc.) of femto node 204 and/or one or more macro nodes, such as macro node 206, at the UE.

For example, as described, femto node 204 can utilize restricted association to communicate with UE 202 while restricting access of other UEs. For instance, femto node 204 can implement a closed or hybrid communications mode associated with a closed subscriber group (CSG). For example, femto node 204 can broadcast CSG support and access mode such that UEs receiving the broadcast can determine whether to access femto node 204. In this example, UEs in the expanded coverage area transmitting measurement reports to the femto node 204 can indicate to the femto node whether access to the CSG is allowed. In another example, UE registration receiving component 220 and/or measurement report receiving component 222 can determine whether one or more UEs are member UEs allowed to access femto node 204 based on receiving an identifier thereof in the registration attempt or measurement report, and obtaining subscription information from the wireless network based on the identifier.

In this example, usage estimating component 214 can utilize the measurement reports to determine UE usage of femto node 204; the measurement reports are received over a few days, for example, and observed to determine a pathloss of the UE 202 to femto node 204. For example, calibrating transmit power based on the determined pathloss can allow for covering previous idle resting locations for which femto node 204 coverage is desired but not available. For instance, usage estimating component 214 can detect one or more UEs that are a member of the CSG of femto node 204 registering during the transmit power burst for the pilot channel, such as UE 202. Usage estimating component 214 can utilize such registrations and/or corresponding measurement reports to compute a transmit power calibration for femto node 204. For example, power calibrating component 212 can accordingly calibrate the transmit power for femto node 204 after the transmit power burst to cover the one or more member UEs, such as UE 202. Moreover, as described, power calibrating component 212 can consider potential interference to non-member UEs in determining a transmit power calibration. For example, power calibrating component 212 can evaluate measurement reports received from non-member UEs to ensure a selected transmit power calibration does not substantially interfere with the non-member UEs.

For example, usage estimating component 214 can determine a transmit power calibration necessary to accommodate a member UE, such as UE 202, that favors macro node 206 when femto node 204 operates at a current base transmit power (e.g., according to a received measured signal strength of macro node 206). Power calibrating component 212 can then determine if the power calibration would cause interference to one or more non-member UEs based on their reported measurements of macro node 206. For example, power calibrating component 212 can determine a power calibration to accomplish both ends. Power calibrating component 212 can modify the transmit power of femto node 204 according to the determined power calibration. Moreover, in an example, femto node 204 can estimate a location of UE 202 based on received signal measurements of femto node 204, macro node 206, and/or other nodes received in measurement reports (e.g., using triangulation with known location of the nodes).

In another example, usage estimating component 214 can estimate UE 202 usage of femto node 204 based at least in part on a UL RSSI at femto node 204. In this example, usage estimating component 214 can infer whether UE 202 is within an area that should be covered by femto node 204 based at least in part on comparing UL RSSI following handover of the UE 202 to another base station over a period of time. For example, UE mode determining component 218 can detect handover (e.g., active mode handout, idle mode reselection, etc.) of a served UE, such as UE 202, to another base station, such as macro node 206. In this example, RSSI measuring component 224 can begin measuring uplink RSSI following handout or reselection, which can include capturing and processing logs of the interference levels upon handover.

For example, RSSI measuring component 224 can take measurements for an initial time period upon detecting the handout/reselection, and at least one subsequent time period following handout/reselection. The measurements can include obtaining an averaging of one or more samples over the time periods, a filtered value representing the one or more samples, and/or the like. For example, the subsequent time period can be determined as a fixed point in time following the initial time period, determined based on one or more detected events, and/or the like. Usage estimating component 214 can compare the measurements to determine a usage of femto node 204 or related parameters for observation to determine the usage, and/or whether to perform a transmit power calibration to serve UE 202.

For example, where the UL RSSIs measured over the time periods are similar (e.g., within a threshold difference), usage estimating component 214 can infer that the UE has been within an area intended to be covered by femto node 204 since handover to macro node 206, and can thus determine to calibrate transmit power to serve UE 202. This can be effectuated by fixed increment increases of the base transmit power until UE 202 is served, by a calibration determined based on the RSSI, etc. In another example, where the later measured RSSIs are over a threshold difference lower than the initial measured RSSIs (and/or continue to decrease over time), usage estimating component 214 can infer that UE 202 is not in an area intended to be covered by femto node 204, and can thus maintain a current transmit power, decrease transmit power, etc., allowing UE 202 to continue communicating in macro node coverage. Power calibrating component 212 can calibrate transmit power as determined by usage estimating component 214.

Figure 3:
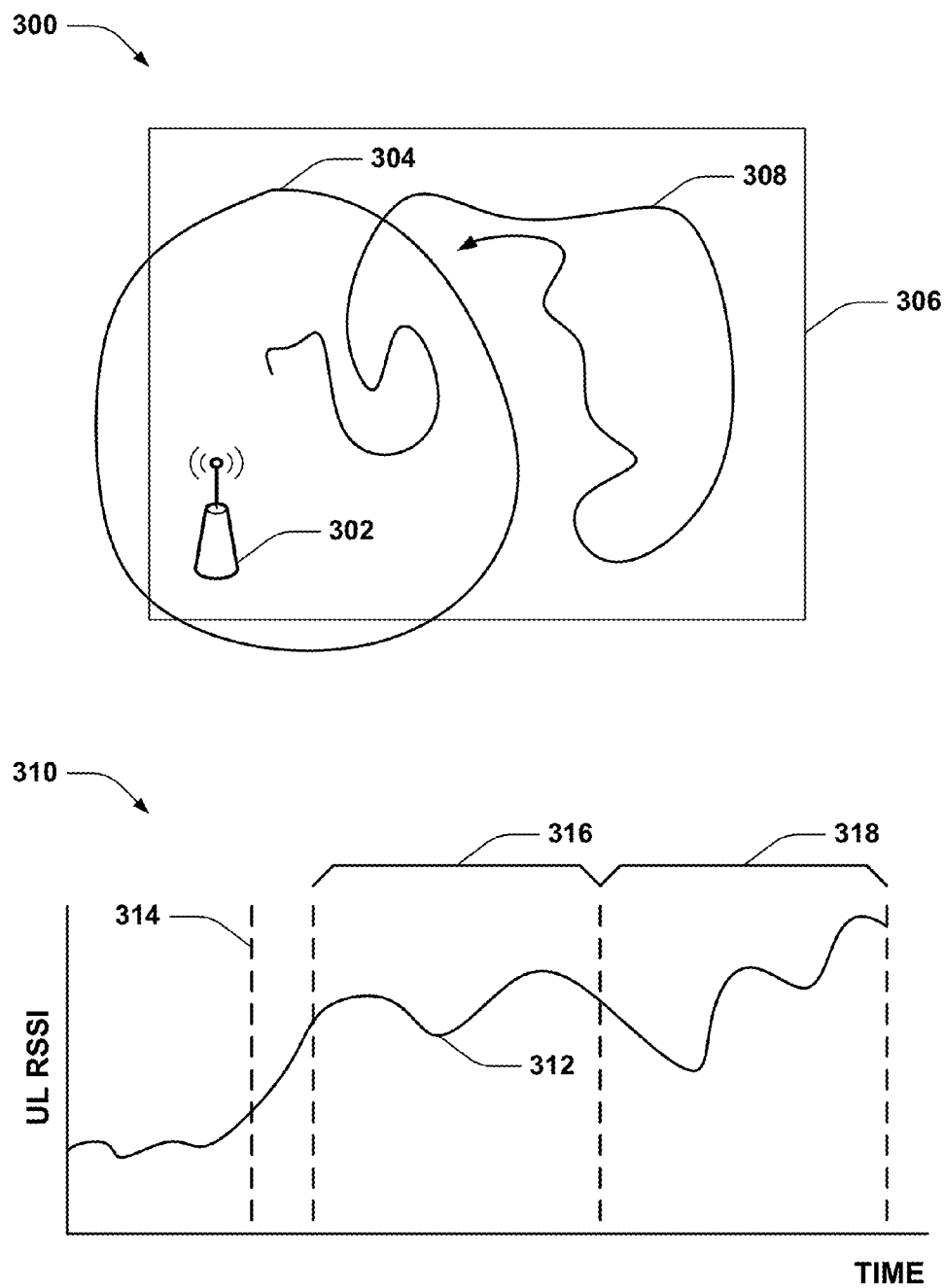
FIG. 3 is a block diagram of an example usage map for a UE at a femto node where the femto node does not cover an entire premises.
Figure 4:
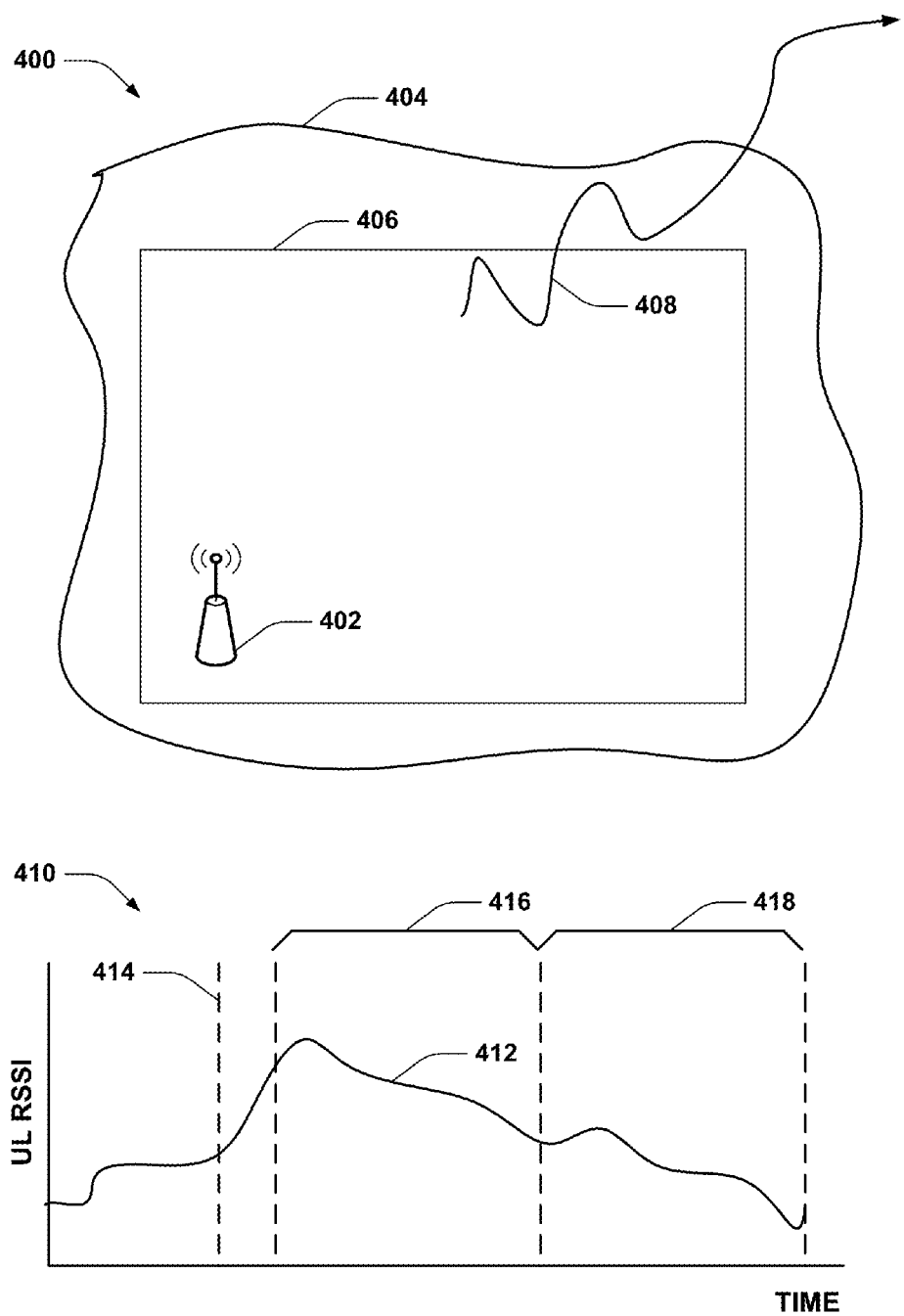
FIG. 4 is a block diagram of an example usage map for a UE at a femto node where the femto node covers a premises.

FIGS. 3 and 4 illustrate example UE usage maps at a femto node and associated RSSI measurements at the femto node. In FIG. 3, an example usage map 300 is illustrated with a femto node 302 providing coverage area 304 over premises 306. In addition, a usage path 308 of a UE is shown where the UE initiates connection to femto node 302 within coverage area 304 and moves outside of coverage area 304 while still in premises 306, resulting in handover to a macro node (not shown). Such usage can be detected, as described, based in part on analyzing UL RSSI. UL RSSI over time at the femto node 302 relating to the UE usage map 300 is shown at 310. The UE is handed over to the macro node after exiting coverage area 304 at 314. UL RSSI can be evaluated over an initial time period 316 beginning at or soon after handover, as well as over a subsequent time period 318, which can be defined as a fixed time period after the initial time period 316, defined based on one or more events encountered during initial time period 316, and/or the like. As shown, the UL RSSI over time periods 316 and 318 are similar, which can indicate the UE is within the premises 306 in an area intended to be covered by femto node 302, as opposed to where the RSSI in time period 318 is at least a threshold lower than RSSI in time period 316. For example, measuring the RSSI can include measuring an average or filtered value of the RSSI over the time periods 416 and 418.

In FIG. 4, an example usage map 400 is illustrated with a femto node 402 providing coverage area 404 over the entire premises 406. In addition, a usage path 408 of a UE is shown where the UE initiates connection with femto node 402 within coverage area 404 and moves outside of premises 406 and coverage area 404, resulting in handover to a macro node (not shown). The UE moving to an area outside of premises 406 can be detected based in part on analyzing UL RSSI. For example, UL RSSI over time relating to the UE usage map 400 is shown at 410. The UE is handed over to the macro node after exiting coverage area 404 at 414. UL RSSI can be evaluated over an initial time period 416 beginning at or soon after handover, as well as over a subsequent time period 418, which can be defined as a fixed time period after the initial time period 416, defined based on one or more events encountered during initial time period 416, and/or the like. As shown, the UL RSSI over time period 418 is lower than that over time period 416, which can indicate the UE moves outside the coverage area 404, as opposed to where the RSSI in time periods 416 and 418 is similar and the UE is in an area intended to be covered by femto node 402. In an example, UL RSSI over time periods 418 and 416 can be compared to determine the difference is at least at a threshold, as described previously in detecting that UE is moving outside of coverage area 404. For example, this can include measuring an average or filtered value of the RSSI over the time periods 416 and 418.

Figure 5:
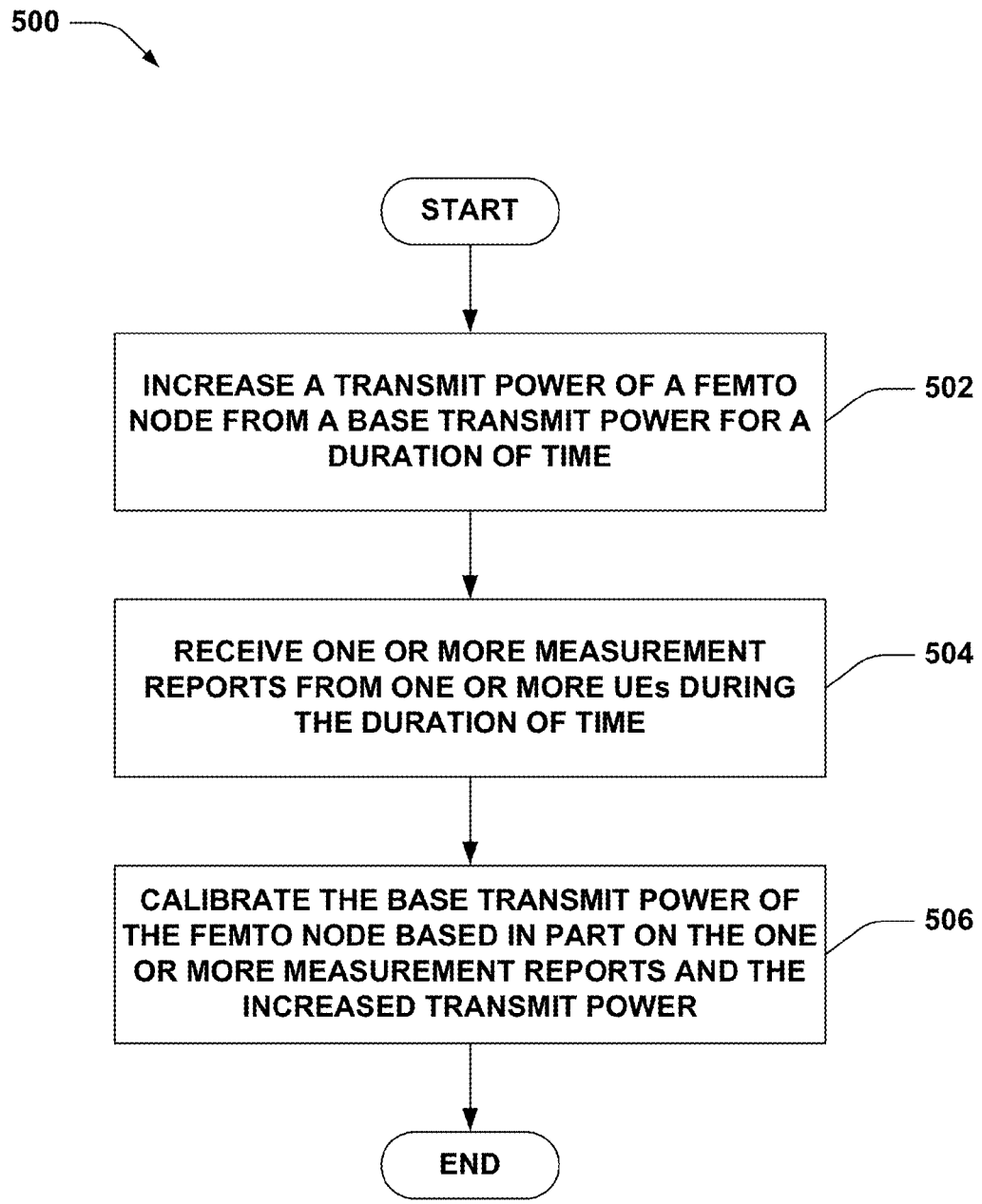
FIG. 5 is a flow chart of an aspect of an example methodology for calibrating power of a femto node.
Figure 6:
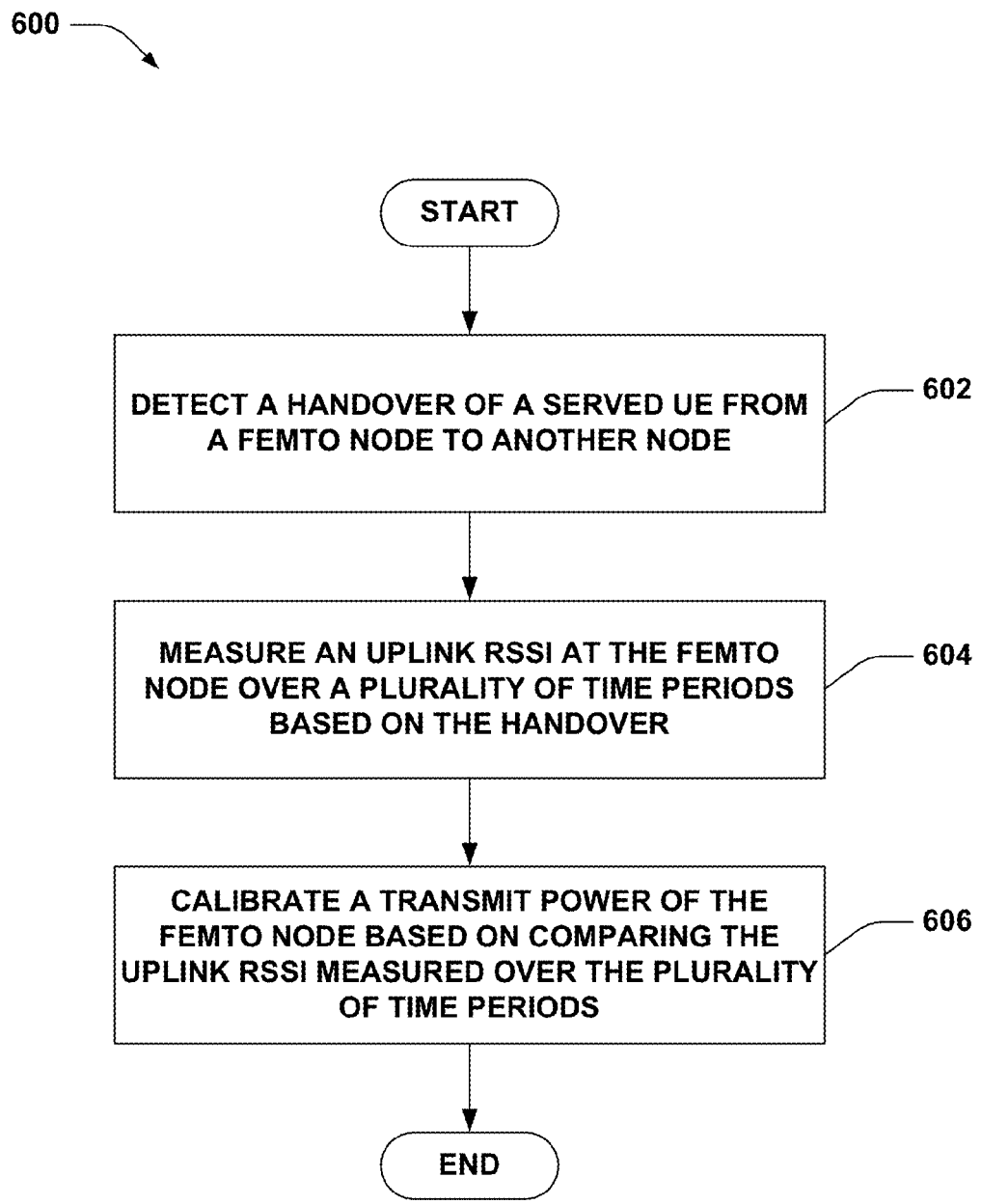
FIG. 6 is a flow chart of an aspect of an example methodology for calibrating power of a femto node based on received signal strength indicator (RSSI) measurements.
Figure 7:
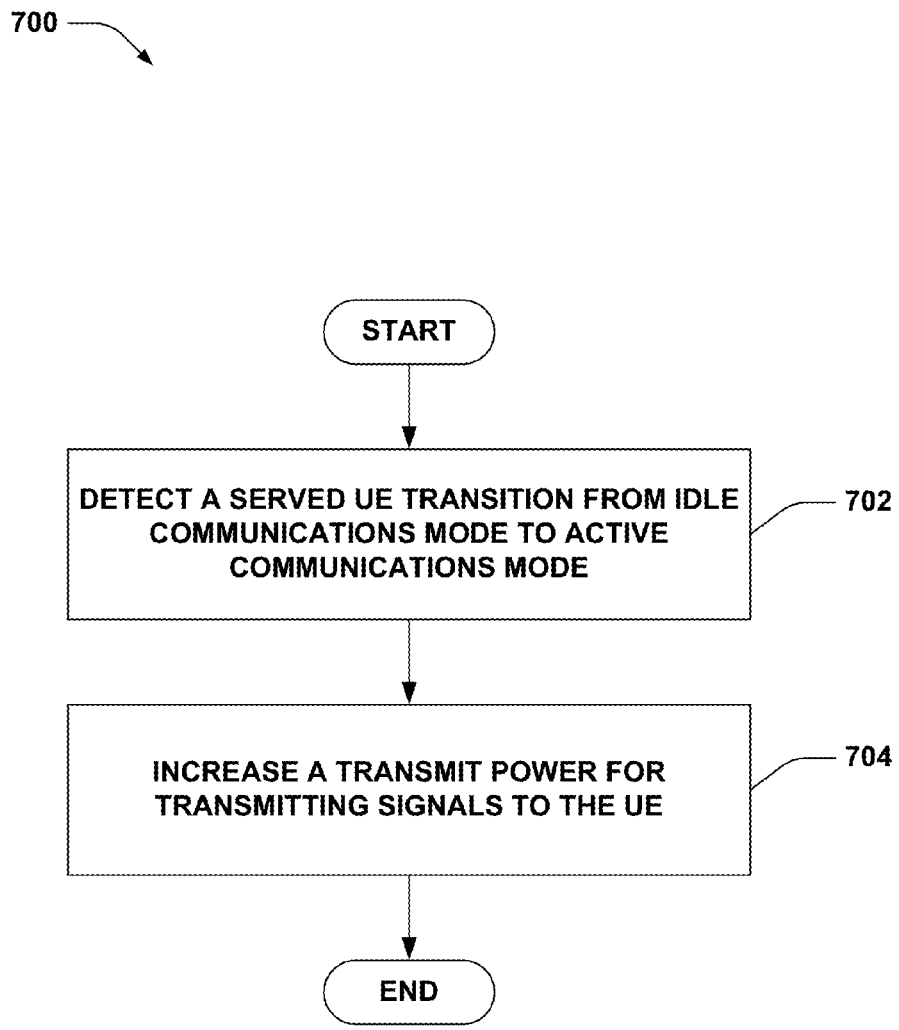
FIG. 7 is a flow chart of an aspect of an example methodology for adjusting a transmit power based on a detected switch in communications mode of a UE.

FIGS. 5-7 illustrate example methodologies relating to expanding coverage area of a femto node to serve one or more intended UEs. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 5 depicts an example methodology 500 for calibrating power of a femto node to serve one or more intended UEs.

At 502, a transmit power of a femto node can be increased from a base transmit power for a duration of time. In one example, the transmit power can be increased based on detecting a UE switch from an idle communications mode to an active communications mode, where the increase in transmit power can last for the duration of active communications mode at the UE. In this example, the transmit power can be increased by a fixed value, by a dynamic value computed based on one or more measurement reports (including at least a measurement of the femto node and/or of a strongest macro node in the vicinity of the one or more UEs) received from one or more UEs, a value computed based on historical measurement reports (including at least a measurement of the femto node and/or of a strongest macro node in the vicinity of the one or more UEs) received from one or more UEs, and/or the like.

In another example, the transmit power is periodically increased over a short period of time (a burst) for a duration of time sufficient to capture registration requests from UEs in the vicinity. For example, this can be on the order of minutes and/or can correlate to a time at a UE for evaluating cells for reselection. In addition, the burst can occur in a period of time where interference to surrounding nodes is expected to be minimized and/or when member UEs are expected to be in the vicinity of the femto node (e.g., during late night or early morning hours). Moreover, periodic increasing of the transmit power can cease once one or more member UEs are served by the femto node.

At 504, one or more measurement reports can be received from one or more UEs during the duration of time. For example, this can be a result of the increase in transmit power. Measurement reports can be received from served UEs (e.g., a UE switching to an active mode), non-member UEs that may be interfered by the femto node during the duration of time, and/or the like. In addition, as described, the measurement reports can be received within or in connection with one or more registration attempts from the UEs.

At 506, the base transmit power of the femto node can be calibrated based in part on the one or more measurement reports and the increased transmit power. Thus, for example, a power calibration can be determined to allow for serving one or more member UEs from which measurement reports are received, while mitigating interference to one or more non-member UEs from which measurement reports are received. For example, a transmit power to serve the member UEs can be determined based on the increased transmit power and the corresponding pathloss reported by the UE, and similarly, the transmit power to mitigate interference to one or more non-member UEs can be determined based on the increased transmit power and corresponding measurement reports received from the non-member UEs. As described, the member and non-member UEs can be identified based on an identifier in the measurement report or registration requests from the UEs, subscription information obtained from the wireless network, an indication from the UE of whether the UE can access a CSG of the femto node, and/or the like.

FIG. 6 illustrates an example methodology 600 for calibrating transmit power of a femto node.

At 602, a handover of a served UE from a femto node to another node can be detected. This can be detected at the femto node based on the femto node causing or otherwise being instructed to perform the handover.

At 604, an uplink RSSI can be measured at the femto node over a plurality of time periods based on the handover. This can include measuring over an initial time period following handover and a subsequent time period. The time periods can be defined as fixed times following handover, by one or more events occurring at the femto node, and/or the like, as described. The uplink RSSIs can be measured from logs at the femto node, and can include measuring an average or filtered value over the time periods.

At 606, a transmit power of the femto node can be calibrated based on comparing the uplink RSSI measured over the plurality of time periods. For example, this can include determining whether the RSSI over the time periods are within a threshold difference of one another. If so, this can indicate that a transmit power should be calibrated to include the served UE that was handed over. As described, such behavior in RSSI can indicate the served UE remained near the femto node despite being handed over to the other node. In this example, the transmit power is calibrated by increasing the transmit power according to a fixed value, according to a value computed based on a measurement report from the served UE, and/or the like.

FIG. 7 illustrates an example methodology 700 for increasing transmit power of a femto node to expand a coverage area thereof.

At 702, a served UE is detected to transition from an idle to an active communications mode. For example, this can include receiving a random access request or other indication of a communications mode switch from the UE, receiving a page for the UE from a wireless network component, and/or the like.

At 704, a transmit power can be increased for transmitting signals to the UE. This can improve coverage for the UE at the femto node, which can improve communications thereof and/or a user experience at the UE. In addition, as described, receiving measurement reports from the UE during the active communications mode can facilitate calibrating a base transmit power of the femto node. In one example, the transmit power can be decreased to a base transmit power following the UE transitioning from the active communications mode to the idle communications mode.

It will be appreciated that, in accordance with one or more aspects described herein, inferences can be made regarding determining a transmit power calibration for the femto node based on one or more received measurement reports, determining a communications mode switch of a UE, determining a transmit power adjustment for a UE switching to an active communications mode, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
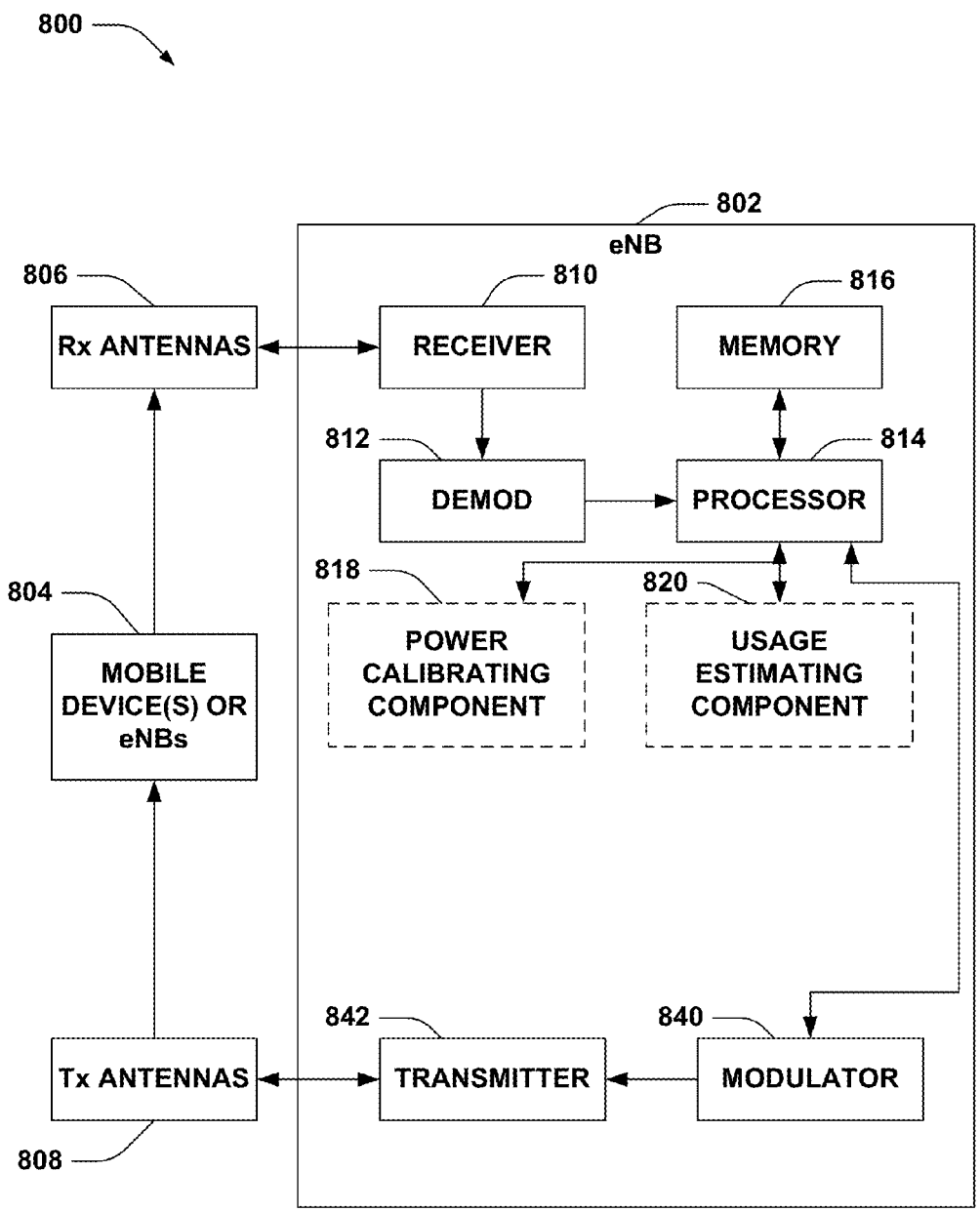
FIG. 8 is a block diagram of a system in accordance with aspects described herein.

FIG. 8 is an illustration of a system 800 that facilitates calibrating transmit power of a femto node. System 800 includes a eNB 802 having a receiver 810 that receives signal(s) from one or more mobile devices or eNBs 804 through a plurality of receive antennas 806 (e.g., which can be of multiple network technologies), and a transmitter 842 that transmits to the one or more mobile devices or eNBs 804 through a plurality of transmit antennas 808 (e.g., which can be of multiple network technologies). For example, eNB 802 can transmit signals received from eNBs 804 to other eNBs 804, and/or vice versa. Receiver 810 can receive information from one or more receive antennas 806 and is operatively associated with a demodulator 812 that demodulates received information. In addition, in an example, receiver 810 can receive from a wired backhaul link. Though depicted as separate antennas, it is to be appreciated that at least one of receive antennas 806 and a corresponding one of transmit antennas 808 can be combined as the same antenna. Demodulated symbols are analyzed by a processor 814, which is coupled to a memory 816 that stores information related to performing one or more aspects described herein.

Processor 814, for example, can be a processor dedicated to analyzing information received by receiver 810 and/or generating information for transmission by a transmitter 842, a processor that controls one or more components of eNB 802, and/or a processor that analyzes information received by receiver 810, generates information for transmission by transmitter 842, and controls one or more components of eNB 802. In addition, processor 814 can perform one or more functions described herein and/or can communicate with components for such a purpose.

Memory 816, as described, is operatively coupled to processor 814 and can store data to be transmitted, received data, information related to available channels, data associated with analyzed signal and/or interference strength, information related to an assigned channel, power, rate, or the like, and any other suitable information for estimating a channel and communicating via the channel. Memory 816 can additionally store protocols and/or algorithms associated with calibrating transmit power of eNB 802.

It will be appreciated that the data store (e.g., memory 816) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory.

Processor 814 is further optionally coupled to a power calibrating component 818, which can be similar to power calibrating component 212, and/or usage estimating component 820, which can be similar to usage estimating component 214, and can comprise one or more further components thereof. Moreover, for example, processor 814 can modulate signals to be transmitted using modulator 840, and transmit modulated signals using transmitter 842. Transmitter 842 can transmit signals to mobile devices or eNBs 804 over Tx antennas 808. Furthermore, although depicted as being separate from the processor 814, it is to be appreciated that the power calibrating component 818, usage estimating component 820, demodulator 812, and/or modulator 840 can be part of the processor 814 or multiple processors (not shown), and/or stored as instructions in memory 816 for execution by processor 814.

Figure 9:
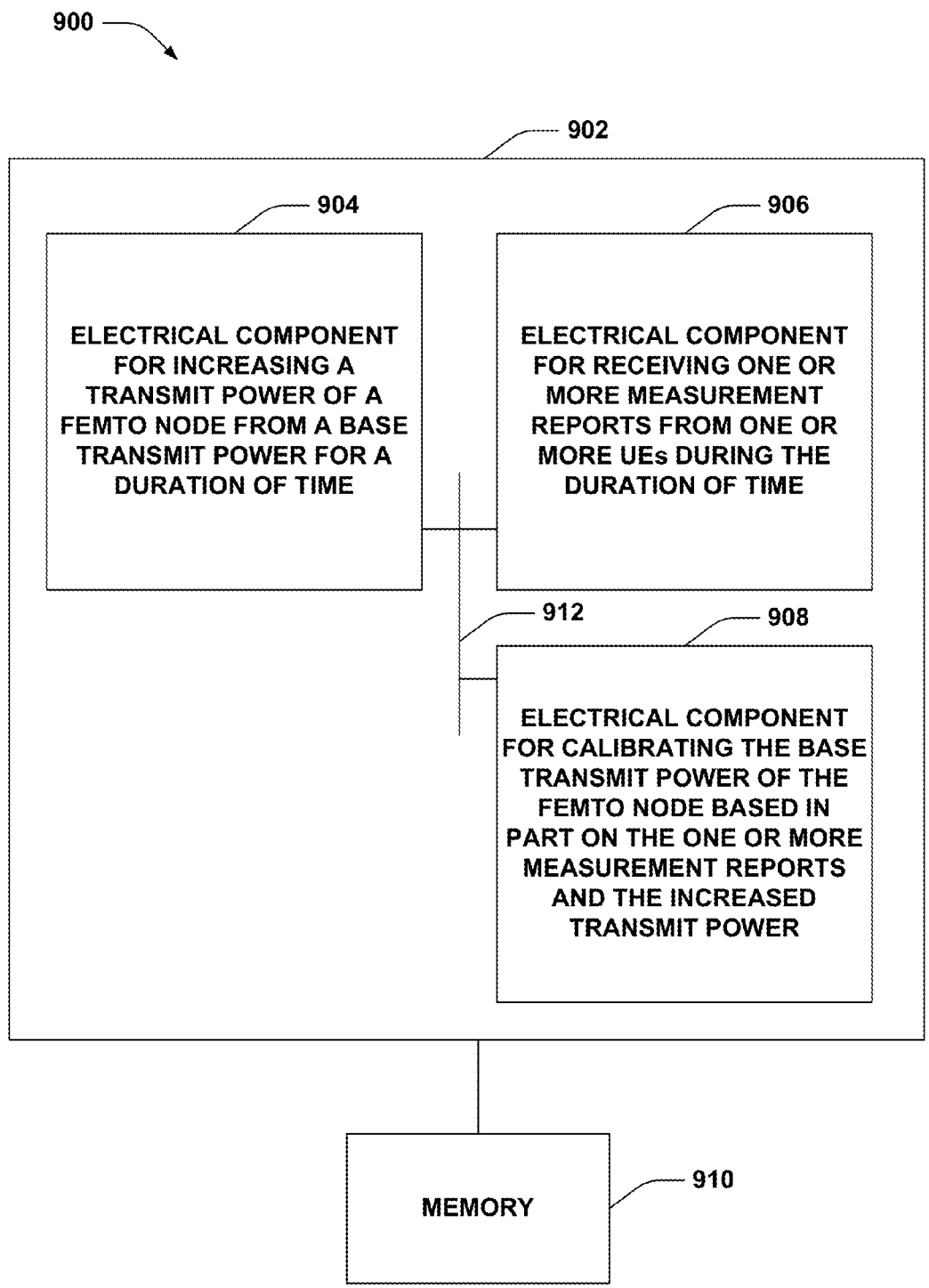
FIG. 9 is a block diagram of an aspect of a system that calibrates power of a femto node based on temporarily increasing a transmit power.

FIG. 9 illustrates a system 900 for calibrating power of a femto node. For example, system 900 can reside at least partially within a femto node or other low power base station. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for increasing a transmit power of a femto node from a base transmit power for a duration of time 904. As described, this can be based on a detected communications mode switch, and/or can correspond to a short power burst to receiving registration attempts from one or more UEs. Further, logical grouping 902 can include an electrical component for receiving one or more measurement reports from one or more UEs during the duration of time 906.

As described, the measurement reports can include signal strength or quality measurements of the femto node and/or one or more other nodes, and/or can be received in conjunction with registration requests from the one or more UEs. Logical grouping 902 can further include an electrical component for calibrating the base transmit power of the femto node based in part on the one or more measurement reports and the increased transmit power 908. Moreover, in an example, the transmit power can be increased by electrical component 904 based on the measurement reports or a history of measurement reports (or a fixed value), as described.

For example, electrical component 904 can include a power adjusting component 216, as described above. In addition, for example, electrical component 906, in an aspect, can include a measurement report receiving component 222, and/or electrical component 908 can include a power calibrating component 212, a usage estimating component 214, and/or the like, as described.

Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910. Moreover, for example, electrical components 904, 906, and 908 can be interconnected by a bus 912. In one example, electrical components 904, 906, and 908 can include at least one processor, or each electrical component 904, 906, and 908 can be a corresponding module of at least one processor. Moreover, in an additional or alternative example, electrical components 904, 906, and 908 can be a computer program product comprising a computer readable medium, where each electrical component 904, 906, and 908 can be corresponding code.

Figure 10:
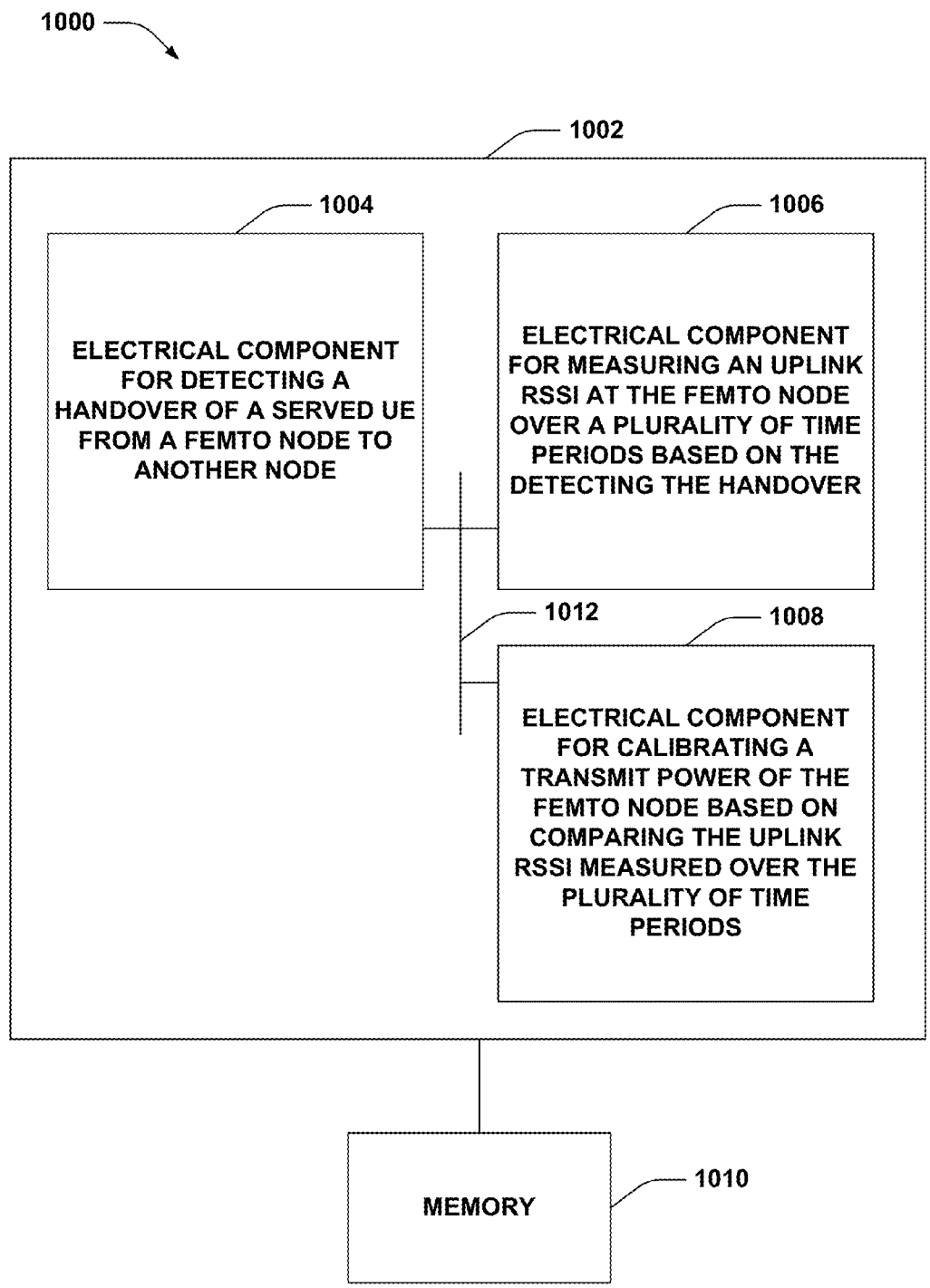
FIG. 10 is a block diagram of an aspect of a system that calibrates power of a femto node based on RSSI measurements.

FIG. 10 illustrates a system 1000 for calibrating transmit power of a femto node. For example, system 1000 can reside at least partially within a femto node or other low power base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for detecting a handover of a served UE from a femto node to another node 1004. Further, logical grouping 1002 can include an electrical component for measuring an uplink RSSI at the femto node over a plurality of time periods based on the detecting the handover 1006.

Logical grouping 1002 can further include an electrical component for calibrating a transmit power of the femto node based on comparing the uplink RSSI measured over the plurality of time periods 1008. As described, this can include determining whether the RSSI measurements are within a threshold difference, which can indicate to increase a base transmit power at the femto node, for example.

In an example, electrical component 1004 can include a UE mode determining component 218, as described above. In addition, for example, electrical component 1006, in an aspect, can include a RSSI measuring component 224, and/or electrical component 1008 can include a power calibrating component 212, usage estimating component 214, and/or the like, as described.

Additionally, system 1000 can include a memory 1010 that retains instructions for executing functions associated with the electrical components 1004, 1006, and 1008. While shown as being external to memory 1010, it is to be understood that one or more of the electrical components 1004, 1006, and 1008 can exist within memory 1010. Moreover, for example, electrical components 1004, 1006, and 1008 can be interconnected by a bus 1012. In one example, electrical components 1004, 1006, and 1008 can include at least one processor, or each electrical component 1004, 1006, and 1008 can be a corresponding module of at least one processor. Moreover, in an additional or alternative example, electrical components 1004, 1006, and 1008 can be a computer program product comprising a computer readable medium, where each electrical component 1004, 1006, and 1008 can be corresponding code.

Figure 11:
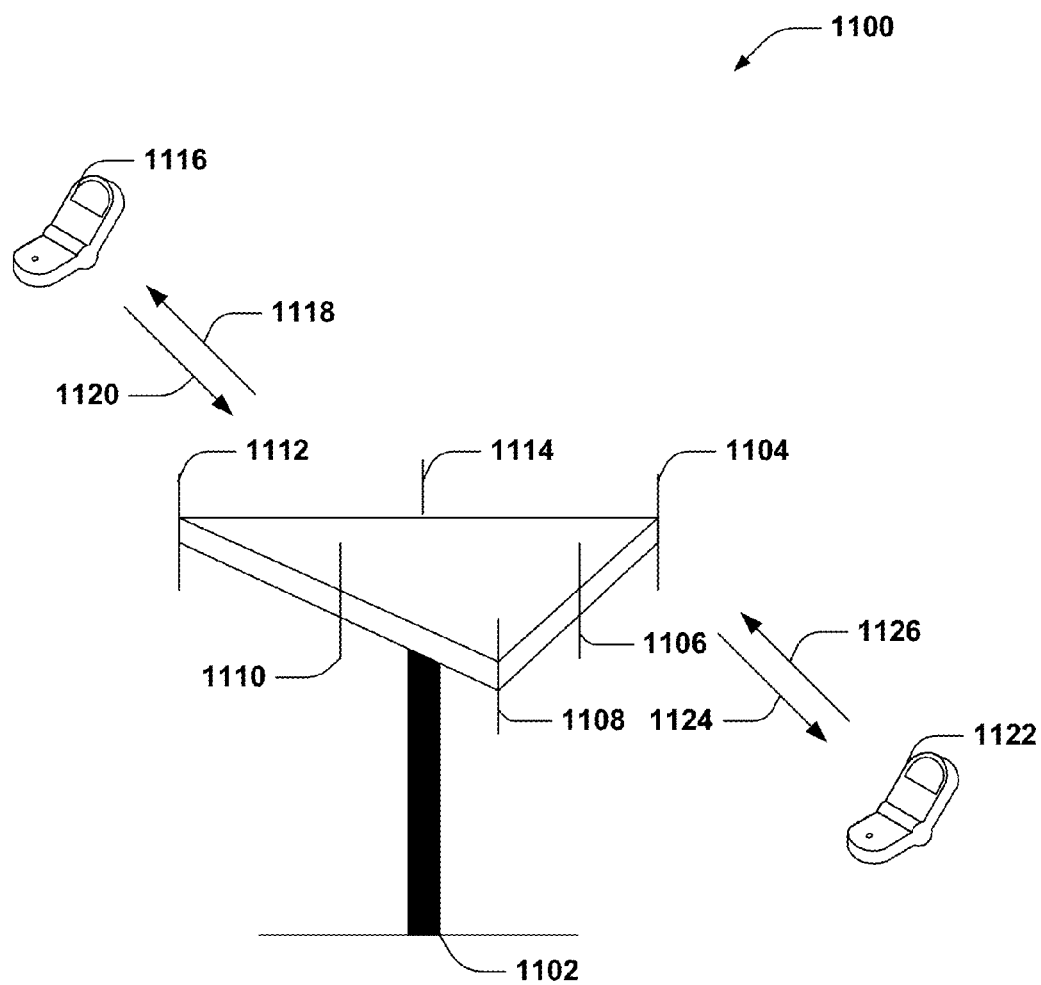
FIG. 11 is a block diagram of an aspect of a wireless communication system in accordance with various aspects set forth herein.

FIG. 11 illustrates a wireless communication system 1100 in accordance with various embodiments presented herein. System 1100 comprises a base station 1102 that can include multiple antenna groups. For example, one antenna group can include antennas 1104 and 1106, another group can comprise antennas 1108 and 1110, and an additional group can include antennas 1112 and 1114. Two antennas are illustrated for each antenna group; however, more or fewer antennas can be utilized for each group. Base station 1102 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 1102 can communicate with one or more mobile devices such as mobile device 1116 and mobile device 1122; however, it is to be appreciated that base station 1102 can communicate with substantially any number of mobile devices similar to mobile devices 1116 and 1122. Mobile devices 1116 and 1122 can be, for example, cellular phones, smart phones, laptops, handheld communication devices, handheld computing devices, satellite radios, global positioning systems, PDAs, and/or any other suitable device for communicating over wireless communication system 1100. As depicted, mobile device 1116 is in communication with antennas 1112 and 1114, where antennas 1112 and 1114 transmit information to mobile device 1116 over a forward link 1118 and receive information from mobile device 1116 over a reverse link 1120. Moreover, mobile device 1122 is in communication with antennas 1104 and 1106, where antennas 1104 and 1106 transmit information to mobile device 1122 over a forward link 1124 and receive information from mobile device 1122 over a reverse link 1126. In a frequency division duplex (FDD) system, forward link 1118 can utilize a different frequency band than that used by reverse link 1120, and forward link 1124 can employ a different frequency band than that employed by reverse link 1126, for example. Further, in a time division duplex (TDD) system, forward link 1118 and reverse link 1120 can utilize a common frequency band and forward link 1124 and reverse link 1126 can utilize a common frequency band.

Each group of antennas and/or the area in which they are designated to communicate can be referred to as a sector of base station 1102. For example, antenna groups can be designed to communicate to mobile devices in a sector of the areas covered by base station 1102. In communication over forward links 1118 and 1124, the transmitting antennas of base station 1102 can utilize beamforming to improve signal-to-noise ratio of forward links 1118 and 1124 for mobile devices 1116 and 1122. Also, while base station 1102 utilizes beamforming to transmit to mobile devices 1116 and 1122 scattered randomly through an associated coverage, mobile devices in neighboring cells can be subject to less interference as compared to a base station transmitting through a single antenna to all its mobile devices. Moreover, mobile devices 1116 and 1122 can communicate directly with one another using a peer-to-peer or ad hoc technology as depicted.

Figure 12:
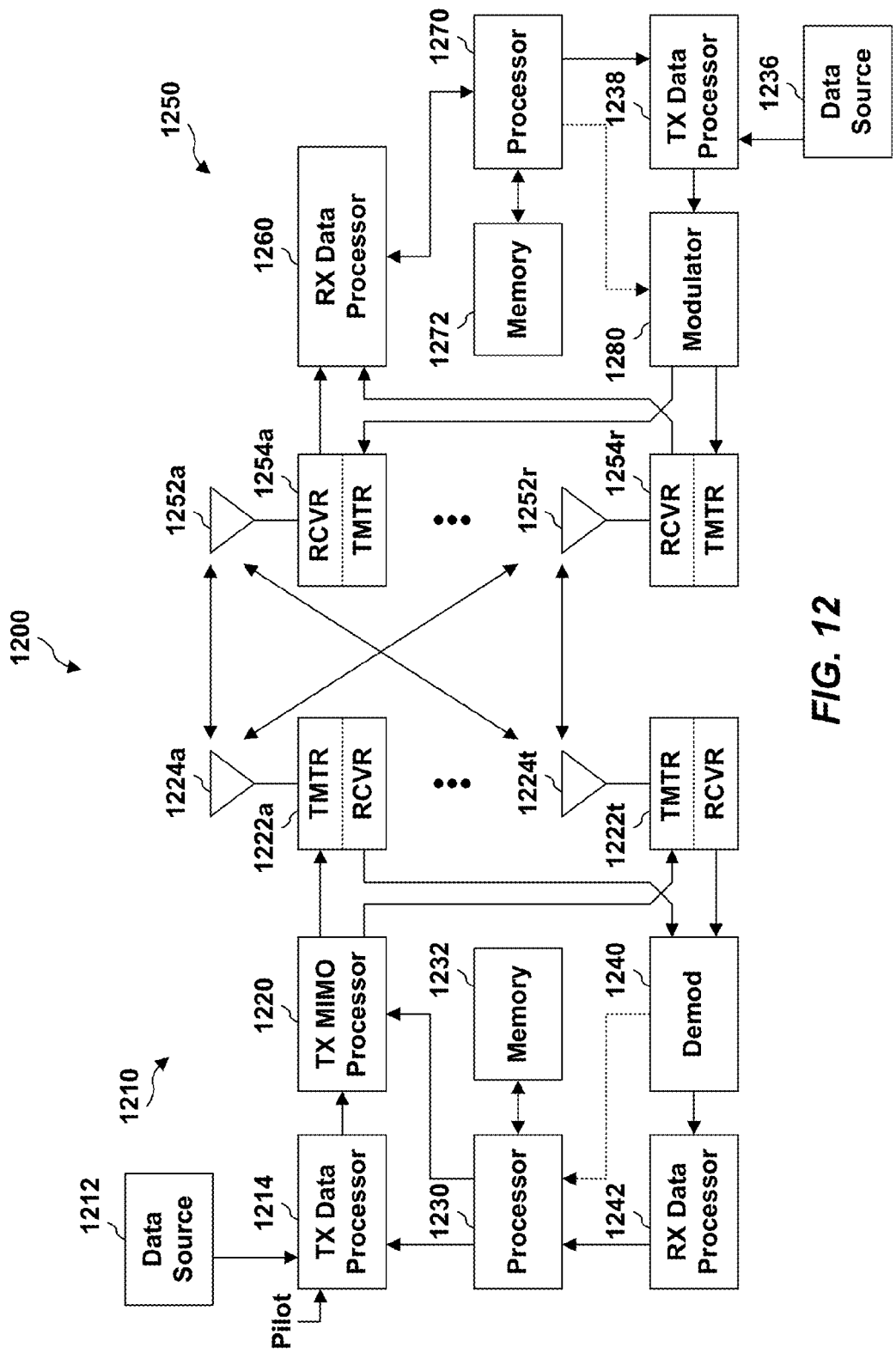
FIG. 12 is a schematic block diagram of an aspect of a wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. Moreover, base station 1210 can be a low power base station, in one example, such as one or more femto nodes previously described. In addition, it is to be appreciated that base station 1210 and/or mobile device 1250 can employ the example systems (FIGS. 1, 2, and 8-11), usage maps (FIGS. 3 and 4), and/or methods (FIGS. 5-7) described herein to facilitate wireless communication there between. For example, components or functions of the systems and/or methods described herein can be part of a memory 1232 and/or 1272 or processors 1230 and/or 1270 described below, and/or can be executed by processors 1230 and/or 1270 to perform the disclosed functions.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. For example, processor 1230 and/or 1270 can execute, and/or memory 1232 and/or 1272 can store instructions related to functions and/or components described herein, such as calibrating transmit power of a femto node (e.g., based on temporarily increasing the transmit power, measuring UL RSSI following handover, etc.), as described.

Figure 13:
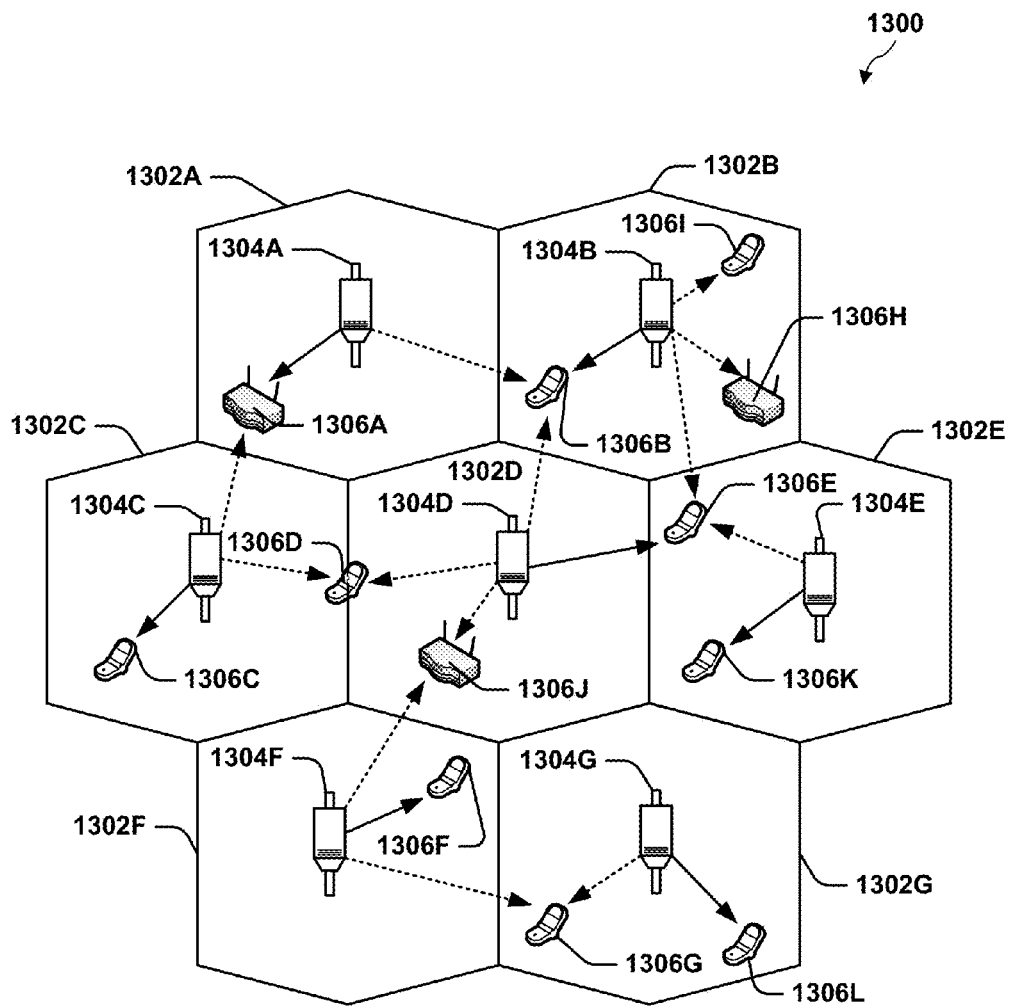
FIG. 13 illustrates an example wireless communication system, configured to support a number of devices, in which the aspects herein can be implemented.

FIG. 13 illustrates a wireless communication system 1300, configured to support a number of users, in which the teachings herein may be implemented. The system 1300 provides communication for multiple cells 1302, such as, for example, macro cells 1302A-1302G, with each cell being serviced by a corresponding access node 1304 (e.g., access nodes 1304A-1304G). As shown in FIG. 13, access terminals 1306 (e.g., access terminals 1306A-1306L) can be dispersed at various locations throughout the system over time. Each access terminal 1306 can communicate with one or more access nodes 1304 on a forward link (FL) and/or a reverse link (RL) at a given moment, depending upon whether the access terminal 1306 is active and whether it is in soft handoff, for example. The wireless communication system 1300 can provide service over a large geographic region.

Figure 14:
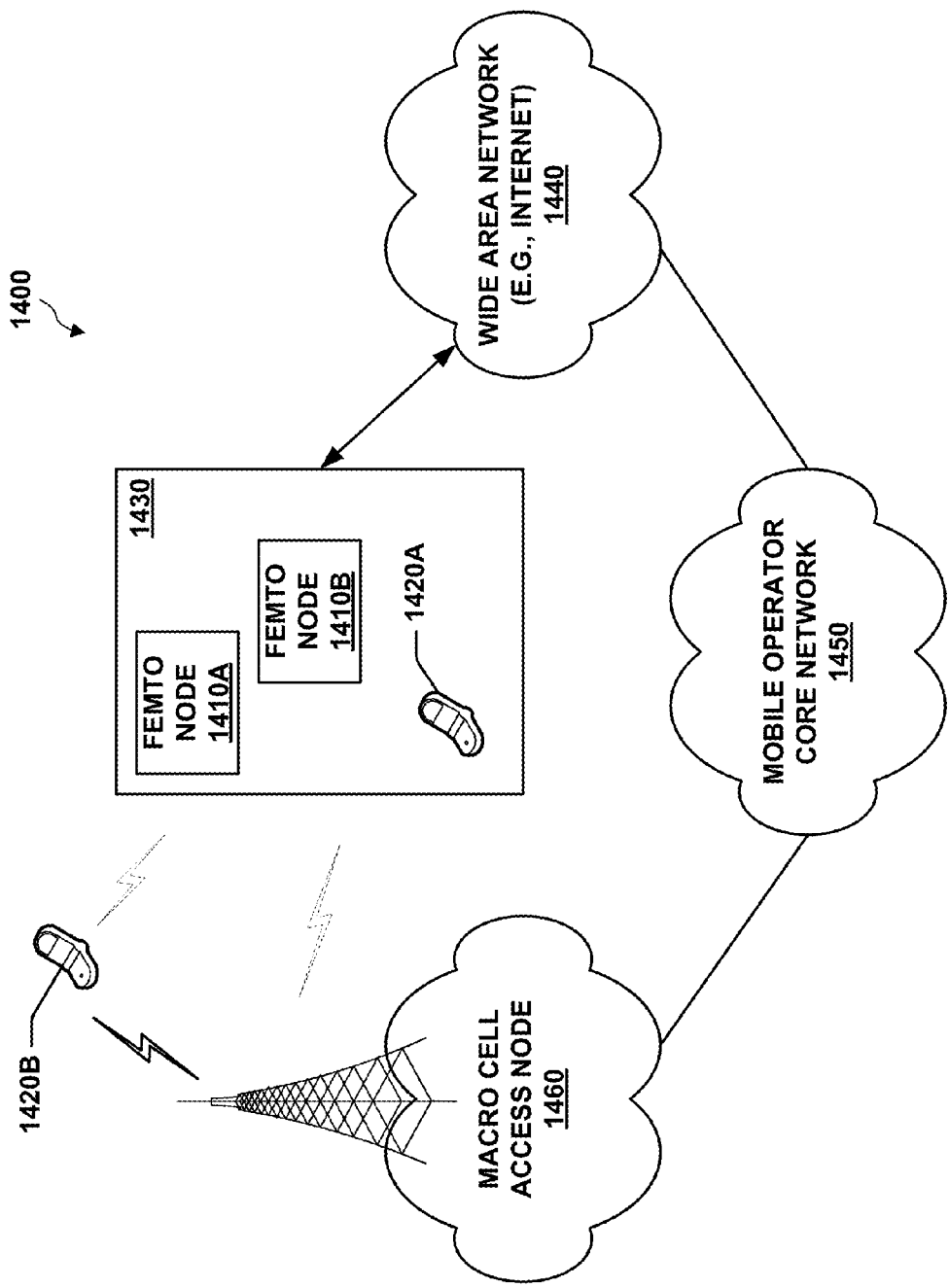
FIG. 14 is an illustration of an exemplary communication system to enable deployment of femtocells within a network environment.

FIG. 14 illustrates an exemplary communication system 1400 where one or more femto nodes are deployed within a network environment. Specifically, the system 1400 includes multiple femto nodes 1410A and 1410B (e.g., femtocell nodes or H(e)NB) installed in a relatively small scale network environment (e.g., in one or more user residences 1430). Each femto node 1410 can be coupled to a wide area network 1440 (e.g., the Internet) and a mobile operator core network 1450 via a digital subscriber line (DSL) router, a cable modem, a wireless link, or other connectivity means (not shown). As will be discussed below, each femto node 1410 can be configured to serve associated access terminals 1420 (e.g., access terminal 1420A) and, optionally, alien access terminals 1420 (e.g., access terminal 1420B). In other words, access to femto nodes 1410 can be restricted such that a given access terminal 1420 can be served by a set of designated (e.g., home) femto node(s) 1410 but may not be served by any non-designated femto nodes 1410 (e.g., a neighbor's femto node).

Figure 15:
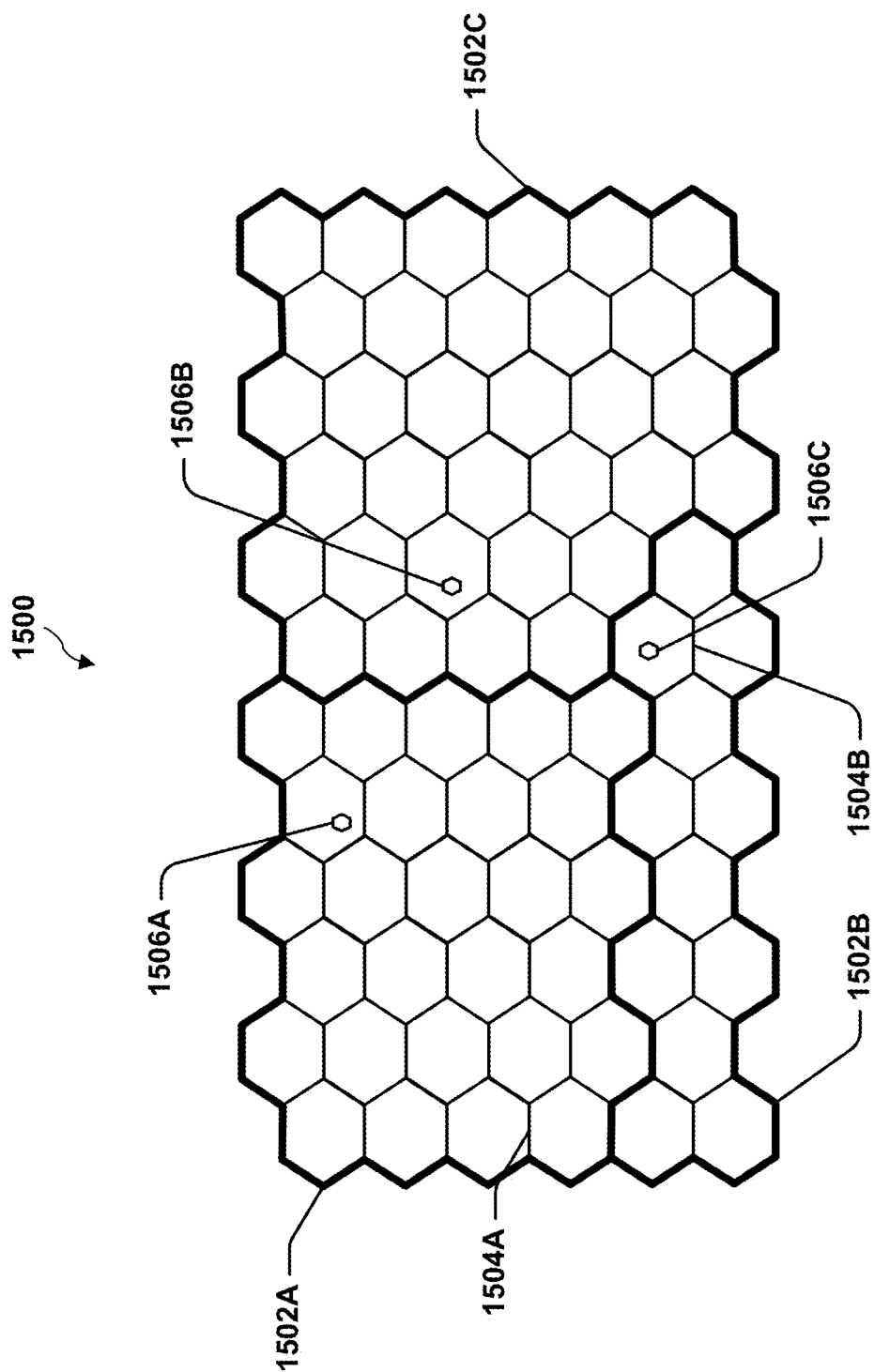
FIG. 15 illustrates an example of a coverage map having several defined tracking areas.

FIG. 15 illustrates an example of a coverage map 1500 where several tracking areas 1502 (or routing areas or location areas) are defined, each of which includes several macro coverage areas 1504. Here, areas of coverage associated with tracking areas 1502A, 1502B, and 1502C are delineated by the wide lines and the macro coverage areas 1504 are represented by the hexagons. The tracking areas 1502 also include femto coverage areas 1506. In this example, each of the femto coverage areas 1506 (e.g., femto coverage area 1506C) is depicted within a macro coverage area 1504 (e.g., macro coverage area 1504B). It should be appreciated, however, that a femto coverage area 1506 may not lie entirely within a macro coverage area 1504. In practice, a large number of femto coverage areas 1506 can be defined with a given tracking area 1502 or macro coverage area 1504. Also, one or more pico coverage areas (not shown) can be defined within a given tracking area 1502 or macro coverage area 1504.

Referring again to FIG. 14, the owner of a femto node 1410 can subscribe to mobile service, such as, for example, a 3G mobile service, offered through the mobile operator core network 1450. In addition, an access terminal 1420 can be capable of operating both in macro environments and in smaller scale (e.g., residential) network environments. Thus, for example, depending on the current location of the access terminal 1420, the access terminal 1420 can be served by an access node 1460 or by any one of a set of femto nodes 1410 (e.g., the femto nodes 1410A and 1410B that reside within a corresponding user residence 1430). For example, when a subscriber is outside his home, he is served by a standard macro cell access node (e.g., node 1460) and when the subscriber is at home, he is served by a femto node (e.g., node 1410A). Here, it should be appreciated that a femto node 1410 can be backward compatible with existing access terminals 1420.

A femto node 1410 can be deployed on a single frequency or, in the alternative, on multiple frequencies. Depending on the particular configuration, the single frequency or one or more of the multiple frequencies can overlap with one or more frequencies used by a macro cell access node (e.g., node 1460). In some aspects, an access terminal 1420 can be configured to connect to a preferred femto node (e.g., the home femto node of the access terminal 1420) whenever such connectivity is possible. For example, whenever the access terminal 1420 is within the user's residence 1430, it can communicate with the home femto node 1410.

In some aspects, if the access terminal 1420 operates within the mobile operator core network 1450 but is not residing on its most preferred network (e.g., as defined in a preferred roaming list), the access terminal 1420 can continue to search for the most preferred network (e.g., femto node 1410) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1420 can limit the search for specific band and channel. For example, the search for the most preferred system can be repeated periodically. Upon discovery of a preferred femto node, such as femto node 1410, the access terminal 1420 selects the femto node 1410 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1410 that reside within the corresponding user residence 1430). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on (e.g., the access terminal is a non-member), except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for calibrating transmission power of a femto node, comprising:
    detecting a switch of at least one user equipment (UE) of a plurality of UEs served by the femto node from an idle communications mode to an active communications mode;
    in response to detecting the switch, increasing a transmit power of the femto node from a base transmit power for a duration of time, wherein the duration of time corresponds to a time the at least one UE is in the active communications mode;
    receiving one or more measurement reports from the at least one UE during the duration of time; and
    calibrating the base transmit power of the femto node based in part on the one or more measurement reports and the increased transmit power to prevent a handover of the at least one UE in a coverage area.

2. The method of claim 1, wherein the increasing the transmit power comprises increasing the transmit power by a fixed value.

3. The method of claim 1, wherein the increasing the transmit power comprises increasing the transmit power by a dynamic value computed based on at least a portion of the one or more measurement reports.

4. The method of claim 3, wherein the dynamic value is computed based on a signal strength measurement of a strongest macro node received by the at least one UE.

5. The method of claim 4, wherein the dynamic value is computed further based on a pathloss edge measurement of the femto node at which handover to the strongest macro node occurs.

6. The method of claim 1, wherein the increasing the transmit power comprises increasing the transmit power by a dynamic value computed based on one or more historical measurement reports received in a previous switch in communications mode by the at least one UE.

7. The method of claim 6, wherein the dynamic value is computed based on a percentile of measurements of a strongest macro node in the one or more historical measurement reports.

8. The method of claim 1, further comprising:
    detecting a second switch of the at least one UE from the active communications mode to the idle communications mode; and
    decreasing the transmit power to the base transmit power based on the second switch.

9. The method of claim 1, wherein the duration of time correlates to a minimum time for the plurality of UEs to attempt registration with the femto node.

10. The method of claim 9, wherein the calibrating the base transmit power is based in part on a pathloss to the femto node and/or one or more macro nodes from the plurality of UEs as indicated in the one or more measurement reports.

11. The method of claim 10, wherein the calibrating the base transmit power is based in part on ensuring a level of interference caused by the femto node to at least a portion of the plurality of UEs is below a threshold.

12. The method of claim 9, wherein the increasing transmit power is performed periodically until at least one of the plurality of UEs is served by the femto node.

13. An apparatus for calibrating transmission power of a femto node, comprising:
at least one processor configured to:
detect a switch of at least one user equipment (UE) of a plurality of UEs served by the femto node from an idle communications mode to an active communications mode;
in response to detecting the switch, increase a transmit power of the femto node from a base transmit power for a duration of time, wherein the duration of time corresponds to a time the at least one UE is in the active communications mode;
receive one or more measurement reports from the at least one UE during the duration of time; and
calibrate the base transmit power of the femto node based in part on the one or more measurement reports and the increased transmit power to prevent a handover of the at least one UE in a coverage area; and
a memory coupled to the at least one processor.

14. The apparatus of claim 13, wherein the at least one processor increases the transmit power by a fixed value.

15. The apparatus of claim 13, wherein the at least one processor increases the transmit power by a dynamic value computed based on at least a portion of the one or more measurement reports.

16. The apparatus of claim 13, wherein the at least one processor increases the transmit power by a dynamic value computed based on one or more historical measurement reports received in a previous switch in communications mode by the at least one UE.

17. The apparatus of claim 13, wherein the duration of time correlates to a minimum time for the one or more UEs to attempt registration with the femto node.

18. The apparatus of claim 17, wherein the at least one processor calibrates the base transmit power based in part on at least one of a pathloss to the femto node and/or one or more macro nodes from the one or more UEs as indicated in the one or more measurement reports, or ensuring a level of interference caused by the femto node to at least a portion of the one or more UEs is below a threshold.

19. An apparatus for calibrating transmission power of a femto node, comprising:
means for detecting a switch of at least one user equipment (UE) of a plurality of UEs served by the femto node from an idle communications mode to an active communications mode;
means for increasing a transmit power of the femto node from a base transmit power for a duration of time in response to detecting the switch, wherein the duration of time corresponds to a time the at least one UE is in the active communications mode;
means for receiving one or more measurement reports from the at least one UE during the duration of time; and
means for calibrating the base transmit power of the femto node based in part on the one or more measurement reports and the increased transmit power to prevent a handover of the at least one UE in a coverage area.

20. The apparatus of claim 19, wherein the means for increasing increases the transmit power by a fixed value.

21. The apparatus of claim 19, wherein the means for increasing increases the transmit power by a dynamic value computed based on at least a portion of the one or more measurement reports.

22. The apparatus of claim 19, wherein the means for increasing increases the transmit power by a dynamic value computed based on one or more historical measurement reports received in a previous switch in communications mode by the at least one UE.

23. The apparatus of claim 19, wherein the duration of time correlates to a minimum time for the plurality of UEs to attempt registration with the femto node.

24. The apparatus of claim 23, wherein the means for calibrating calibrates the base transmit power based in part on at least one of a pathloss to the femto node and/or one or more macro nodes from the plurality of UEs as indicated in the one or more measurement reports, or ensuring a level of interference caused by the femto node to at least a portion of the plurality of UEs is below a threshold.

25. A non-transitory computer-readable medium storing computer executable codes for calibrating transmit power of a femto node, comprising:
code for causing at least one computer to detect a switch of at least one user equipment (UE) of a plurality of UEs served by the femto node from an idle communications mode to an active communications mode;
code for causing the at least one computer to increase a transmit power of the femto node from a base transmit power for a duration of time in response to detecting the switch, wherein the duration of time corresponds to a time the at least one UE is in the active communications mode;
code for causing the at least one computer to receive one or more measurement reports from the at least one UE during the duration of time; and
code for causing the at least one computer to calibrate the base transmit power of the femto node based in part on the one or more measurement reports and the increased transmit power to prevent a handover of the at least one UE in a coverage area.

26. The computer-readable medium of claim 25, wherein the code for causing the at least one computer to increase increases the transmit power by a fixed value.

27. The computer-readable medium of claim 25, wherein the code for causing the at least one computer to increase increases the transmit power by a dynamic value computed based on at least a portion of the one or more measurement reports.

28. The computer-readable medium of claim 25, wherein the code for causing the at least one computer to increase increases the transmit power by a dynamic value computed based on one or more historical measurement reports received in a previous switch in communications mode by the at least one UE.

29. The computer-readable medium of claim 25, wherein the duration of time correlates to a minimum time for the plurality of UEs to attempt registration with the femto node.

30. The computer-readable medium of claim 29, wherein the code for causing the at least one computer to calibrate calibrates the base transmit power based in part on at least one of a pathloss to the femto node and/or one or more macro nodes from the one or more UEs as indicated in the one or more measurement reports, or ensuring a level of interference caused by the femto node to at least a portion of the one or more UEs is below a threshold.

31. An apparatus for calibrating transmission power of a femto node, comprising:
- a UE mode determining component for detecting a switch of at least one user equipment (UE) of a plurality of UEs served by the femto node from an idle communications mode to an active communications mode;
- a power adjusting component for increasing a transmit power of the femto node from a base transmit power for a duration of time in response to detecting the switch, wherein the duration of time corresponds to a time the at least one UE is in the active communications mode;
- a measurement report receiving component for receiving one or more measurement reports from the at least one UE during the duration of time; and
- a power calibrating component for calibrating the base transmit power of the femto node based in part on the one or more measurement reports and the increased transmit power to prevent a handover of the at least one UE in a coverage area.

32. The apparatus of claim 31, wherein the power adjusting component increases the transmit power by a fixed value.

33. The apparatus of claim 31, wherein the power adjusting component increases the transmit power by a dynamic value computed based on at least a portion of the one or more measurement reports.

34. The apparatus of claim 33, wherein the dynamic value is computed based on a signal strength measurement of a strongest macro node received by the at least one UE.

35. The apparatus of claim 34, wherein the dynamic value is computed further based on a pathloss edge measurement of the femto node at which handover to the strongest macro node occurs.

36. The apparatus of claim 31, wherein the power adjusting component increases the transmit power by a dynamic value computed based on one or more historical measurement reports received in a previous switch in communications mode by the at least one UE.

37. The apparatus of claim 36, wherein the dynamic value is computed based on a percentile of measurements of a strongest macro node in the one or more historical measurement reports.

38. The apparatus of claim 31, wherein the UE mode determining component detects a second switch of the at least one UE from the active communications mode to the idle communications mode, and the power adjusting component decreases the transmit power to the base transmit power based on the second switch.

39. The apparatus of claim 31, wherein the duration of time correlates to a minimum time for the plurality of UEs to attempt registration with the femto node.

40. The apparatus of claim 39, wherein the power calibrating component calibrates the base transmit power based in part on a pathloss to the femto node and/or one or more macro nodes from the plurality of UEs as indicated in the one or more measurement reports.

41. The apparatus of claim 40, wherein the power calibrating component calibrates the base transmit power based in part on ensuring a level of interference caused by the femto node to at least a portion of the plurality of UEs is below a threshold.

42. The apparatus of claim 39, wherein the power adjusting component increases the transmit power periodically until at least one of the plurality of UEs is served by the femto node.

* * * * *